(12) United States Patent
Özden et al.

(10) Patent No.: US 10,533,366 B2
(45) Date of Patent: Jan. 14, 2020

(54) COMPRESSIBLE PILLAR FOR A VACUUM INSULATED GLAZING UNIT

(71) Applicant: VKR Holding A/S, Hørsholm (DK)

(72) Inventors: Utku Ahmet Özden, Hørsholm (DK);
Simon Johnsen, Hørsholm (DK);
Annette Johncock Krisko, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 0 days.

(21) Appl. No.: 16/274,875

(22) Filed: Feb. 13, 2019

(65) Prior Publication Data
US 2019/0292841 A1  Sep. 26, 2019

(30) Foreign Application Priority Data

Feb. 14, 2018 (DK) ................................ 2018 70088
Feb. 14, 2018 (DK) ................................ 2018 70091

(51) Int. Cl.
*E06B 3/663* (2006.01)
*E06B 3/673* (2006.01)
(Continued)

(52) U.S. Cl.
CPC ........ *E06B 3/66304* (2013.01); *E06B 3/6612* (2013.01); *E06B 3/6736* (2013.01); *E06B 3/6775* (2013.01); *E06B 3/67334* (2013.01)

(58) Field of Classification Search
CPC .................................................. E06B 3/66304
See application file for complete search history.

(56) References Cited

U.S. PATENT DOCUMENTS 6,210,763 B1  4/2001  Katoh
6,420,002 B1  7/2002  Aggas
(Continued)

FOREIGN PATENT DOCUMENTS

EP    1018493 A1    7/2000
EP    1195496 A2    4/2002
(Continued)

OTHER PUBLICATIONS

International Search Report for corresponding application PCT/DK2019/050047 filed Feb. 7, 2019; dated Apr. 11, 2019.
(Continued)

*Primary Examiner* — Adam Krupicka
(74) *Attorney, Agent, or Firm* — Cantor Colburn LLP

(57) ABSTRACT

A compressible pillar is disclosed for the preparation of a vacuum insulated glazing (VIG) unit, having a longitudinal extent in a longitudinal direction when in an uncompressed state, and comprising:
a deformable part comprising an open structure, wherein the open structure at least partially collapses under a compression force acting in the longitudinal direction of the compressible pillar, the compression force being of at least one value selected within the range of 60 N to 320 N such as a value of the compression force being selected from the range of 60 N to 140 N, from the range of 140 N to 230 N, or from the range of 230 N to 320 N, wherein the longitudinal extent of the compressible pillar decreases to a compressed longitudinal extent when the compressible pillar is subjected to the compression force, and
wherein the compressed longitudinal extent of the compressible pillar increases to an expanded longitudinal extent when the compression force is released, wherein the increase in the longitudinal extent is less than the
(Continued)

decrease in the longitudinal extent. Furthermore is disclosed a process of manufacturing a compressible pillar, a method of producing a vacuum insulated glazing unit by the use of such pillars and a vacuum insulated glazing unit comprising such pillars.

22 Claims, 12 Drawing Sheets

(51) Int. Cl.
*E06B 3/677* (2006.01)
*E06B 3/66* (2006.01)

(56) References Cited

U.S. PATENT DOCUMENTS

| 6,479,112 | B1 | 11/2002 | Shukuri |
| 2002/0187299 | A1 | 12/2002 | Jousse |
| 2013/0059087 | A1 | 3/2013 | Veerasamy |
| 2013/0059160 | A1 | 3/2013 | Veerasamy |
| 2015/0218877 | A1 | 8/2015 | Kawahara |

FOREIGN PATENT DOCUMENTS

| EP | 1422204 A1 | 5/2004 |
| EP | 3210944 A1 | 8/2017 |
| WO | 0227135 A1 | 4/2002 |
| WO | 2011144588 A1 | 11/2011 |
| WO | 2014041409 A2 | 3/2014 |
| WO | 2017096050 A1 | 6/2017 |

OTHER PUBLICATIONS

Written Opinion for corresponding application PCT/DK2019/050047 filed Feb. 7, 2019; dated Apr. 11, 2019.
Danish Search Report and Search Opinion for corresponding application PA 2018 70088; dated Aug. 14, 2018.

Total = 140

Collected = 137

Toppled on the side = 11

Measured = 124

Un-able to measure = 2

COMPRESSIBLE PILLAR FOR A VACUUM INSULATED GLAZING UNIT

CROSS REFERENCE TO RELATED APPLICATIONS

This application is related to and claims the benefit of Danish Patent Application Numbers PA201870088 and PA201870091, both filed on Feb. 14, 2018, where the entire contents of both of said applications is incorporated herein by reference.

TECHNICAL FIELD

The disclosure relates to a compressible pillar for a vacuum insulated glazing (VIG) unit, a process of manufacturing the pillar, a method of producing a VIG unit including the pillar, and a VIG unit comprising the pillar.

BACKGROUND

Vacuum insulated glazing (VIG) units comprise a sealed cavity between two glass panes which have been evacuated to a reduced pressure such as 0.001 millibars or less. This low pressure sealed cavity can in turn result in a large pressure asserted on each glass pane towards the sealed cavity. Tempered glass panes can be used in the VIG unit because they have higher strength than regular glass panes, but the disadvantage of tempered glass is the presence of larger surface irregularities compared with regular glass panes. Tempered glass panes generally comprise flatness deviation resulting from the toughening process, such as roller wave distortion which occurs when the soft glass is in contact with rollers in a horizontal toughening process. The distance between two tempered glass panes may therefore vary significantly across the panes.

Pillars, also known as spacers, can be used in VIG units to maintain the sealed cavity thickness and the distance between the glass panes. The pillars can comprise a high compressive strength material that is capable of withstanding the pressures exerted on them from outside the VIG unit by the atmospheric pressure on the external side of the glass panes such that the sealed cavity is maintained. Not only is it desirable to have pillars which comprise a high compressive strength, but also pillars which can allow a certain degree of shear as the glass panes move relative to each other in a direction parallel to the extent of the glass panes, which for example can occur due to thermal expansion and/or wind pressure that can affect the installed VIG unit. Similarly, it is also of advantage having pillars which can relieve any stresses occurring in the glass panes due e.g. to an impact force applied to the glass panes in a direction perpendicular to the glass surface.

Additionally it is desirable that the insulating properties and the transparency of the VIG unit are not significantly affected by the pillars.

Therefore, there remains a continuing need for pillars that can be used between glass panes of a VIG unit, and in particular to pillars that can accommodate for variations in spacing between the glass panes due to glass surface irregularities, thermal transitions, and compressive forces.

EP patent application no. EP 1 018 493 A1 describes a number of different pillars for a vacuum insulated glass panel, including pillars of fixed and variable height. E.g., a pillar is described having two planar contacting faces abutting the glass panes and comprising an elastic member in between, in the form of, e.g., a spring, an open structure, or an elastically deformable material. The pillars are described as being adapted to account for displacements of the panes along and perpendicular to the glass surfaces, such as tempered glass surfaces.

U.S. Pat. No. 6,479,112 describes a glass panel having two glass panes, such as tempered glass panes, separated at pre-determined distance using pillars having a contact surface facing the inner surface of one of the glass panes which comprises protrusion. The pillars are made to a pre-determined height using hard materials such as metal or solder glass. In one embodiment, the pillars may alternatively be made of rubber, such as synthetic resin rubber, allowing the pillar to be flexible and absorb any flexural movement of the panes.

U.S. Pat. No. 6,210,763 describes a pillar, e.g. of cylindrical shape and made of aluminium alloy, capable of maintaining a predetermined distance between two glass panes, such as tempered glass panes, and at the same time be able to relieve stress due to impact through plastic deformation in the pillar.

European patent application EP 3 210 944 A1 discloses a vacuum glass panel having two glass panes, where in order to compensate for surface undulation of the panes, pillars with corresponding heights are arranged on corresponding positions between the layers of plate, and the heights of the pillars match with the spacing between the glass panes at corresponding positions in the vacuum glass panel, so that each pillar can be clamped by the upper and the lower pane and effectively plays a supporting role.

BRIEF SUMMARY

According to an embodiment, it is herein disclosed a compressible pillar for the preparation of a vacuum insulated glazing (VIG) unit, having a longitudinal extent in a longitudinal direction when in an uncompressed state, and comprising:

a deformable part comprising an open structure, wherein the open structure at least partially collapses under a compression force acting in the longitudinal direction of the compressible pillar, the compression force being of at least one value selected within the range of 60 N to 320 N such as a value of the compression force being selected from the range of 60 N to 140 N, from the range of 140 N to 230 N, or from the range of 230 N to 320 N, wherein the longitudinal extent of the compressible pillar decreases to a compressed longitudinal extent when the compressible pillar is subjected to the compression force, and wherein the compressed longitudinal extent of the compressible pillar increases to an expanded longitudinal extent when the compression force is released, wherein the increase in the longitudinal extent is less than the decrease in the longitudinal extent. By the term "open structure" is herein understood a structure having voids or open cavities, which will be at least partly occupied by the material of the structure as the structure at least partially collapses when the compression force is applied.

The compressible pillar is designed to undergo a partly irreversible deformation when subjected to a compression force as disclosed, which includes a non-elastic deformation that may include plastic deformation of the material and possible strain hardening of the pillar. The deformation of the pillar will be partly irreversible and will comprise of elastic deformation, which is reversible and causes the expansion of the pillar when the compression force is released, as well as irreversible deformation of the pillar for which reason the expansion in the longitudinal direction of the pillar is less than the reduction when the pillar is subjected to the compression force. The compressible pillar may be subjected to compression forces of different magnitudes, depending e.g. on the mutual spacing between neighbouring pillars, which depending on the VIG-unit may be from e.g. 25 mm to 50 mm or more. Thus, the pillars may be designed to undergo the partly irreversible deformation within a suitable range of compression forces, which at least partly is included in the range given as 60 N to 320 N, so that one design of pillars according to the embodiment may undergo the partly irreversible deformation at a compression force of 280 N but only elastic deformation at a force of only 100 N, whereas another design of pillars according to the embodiment will undergo the partly irreversible deformation at a compression force of 65 N.

With this compressible pillar is obtained that deviations from evenness of the two glass panes that constitute a VIG-unit may be compensated by the pillars, which allow for a corresponding variation in the distance between the inner surfaces of the two glass panes of the VIG-unit. The partly irreversible deformation of the pillars will cause the forces between the pillars and glass panes of the VIG-unit at the points of contact between the pillars and the glass panes to be much more homogeneous than is achieved with VIG-units having pillars that deform purely elastically during evacuation of the void of the VIG-unit, in which case the forces are minimal where the distance between the glass panes were largest prior to the evacuation and maximal where the distance between the glass panes were smallest prior to the evacuation of the void.

According to a particular embodiment is disclosed a compressible pillar for the preparation of a vacuum insulated glazing (VIG) unit, having a longitudinal extent in a longitudinal direction when in an uncompressed state, and comprising: a deformable part comprising an open structure, wherein the open structure at least partially collapses under a compression force acting in the longitudinal direction of the compressible pillar, the compression force being of at least one value selected within the range of 60 N to 320 N such as a value of the compression force being selected from the range of 60 N to 140 N, from the range of 140 N to 230 N, or from the range of 230 N to 320 N, wherein the longitudinal extent of the compressible pillar decreases to a compressed longitudinal extent when the compressible pillar is subjected to the compression force, the pillar comprises an upper part and a lower part having a top contact surface and a lower contact surface, respectively, for abutting with first and second glass panes of the VIG unit, the deformable part is connected with the upper part and the lower part, the compressible pillar further comprises a substantially uniform cross-section in a parallel plane, wherein the parallel plane is perpendicular to the top contact surface and the lower contact surface.

The upper part, the lower part, and the deformable part may in a particular embodiment form a cross-section in the parallel plane that substantially is the shape of the Greek alphabet capital letter sigma. In a version of that embodiment, two mirrored sigmas are formed.

The shape of the capital sigma Σ, which could also be seen as a capital M comprises two substantially parallel end structures connected by an open structure, which when the pillar is subjected to a compression force in the longitudinal direction of the pillar will collapse substantially solely in the longitudinal direction in a manner that allow the two end structures to remain being parallel and substantially without displacing the end structures in a direction perpendicular to the longitudinal direction of the pillar.

Herein is also disclosed a process of manufacturing a compressible pillar for the preparation of a vacuum insulated glazing (VIG) unit, the process comprising fusing particles of a metal powder by a laser method.

According to an embodiment is disclosed a method of producing a vacuum insulated glazing (VIG) unit, the method comprising the steps of: providing first and second substantially parallel glass panes and a plurality of compressible pillars as disclosed herein, wherein the plurality of compressible pillars is disposed between the first and second glass panes to define a minimum distance between the glass panes, forming a peripheral seal around a periphery of the glass panes to form a sealed cavity between the first and the second glass panes, and reducing the pressure in the sealed cavity to compress the plurality of compressible pillars between the first and the second glass panes.

According to an embodiment is disclosed a vacuum insulated glazing (VIG) unit, comprising: first and second substantially parallel glass panes; a plurality of compressible pillars as disclosed herein, wherein the plurality of compressible pillars is disposed and compressed between the first and the second glass panes; and a peripheral seal attached around a periphery of the first and the second glass panes, thereby forming a sealed cavity between the first and the second glass panes, wherein the sealed cavity is at a pressure below atmospheric pressure.

The above described and other features are exemplified by the following figures and detailed description.

BRIEF DESCRIPTION OF THE DRAWINGS

The following figures are exemplary embodiments wherein the like elements are numbered alike.

FIG. 1b is a perspective view of the pillar of FIG. 1a.

FIGS. 1f and 1g are cross-section views of the compressed pillar of FIG. 1a.

DETAILED DESCRIPTION

Figure 1A:
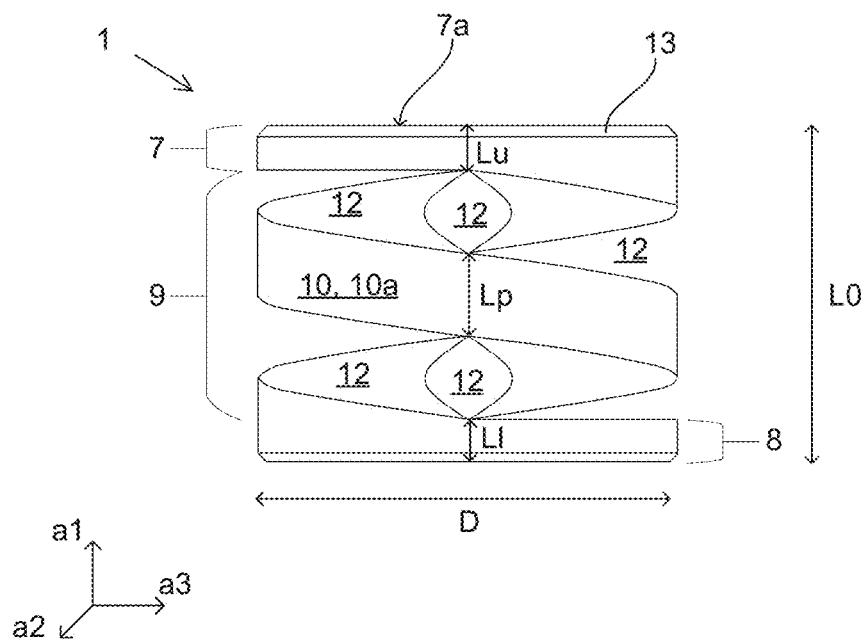
FIG. 1a is a cross-section view of an uncompressed first pillar for use in a VIG unit according to an embodiment, where the pillar comprises a coil-shaped part.

Exemplary embodiments will now be described more fully hereinafter with reference to the accompanying drawings. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary embodiments are described herein with reference to cross section illustrations that are schematic illustrations of idealized embodiments, wherein like reference numerals refer to like elements throughout the specification. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary embodiments of the present disclosure.

The present disclosure relates to a compressible pillar for the preparation of a vacuum insulated glazing (VIG) unit, the pillar having a longitudinal extent in the uncompressed state and comprising a deformable part having an open structure, which open structure will at least partially collapse when the pillar is subject to a compression force in the range of 60 N to 160 N acting in the longitudinal direction of the pillar, the pillar will exhibit a partly irreversible deformation causing a reduction in the longitudinal extent of the pillar when the pillar is subjected to said compression force, so that when said compression force is fully released the pillar will exhibit an expansion in the longitudinal direction of the pillar which is less that said reduction in the longitudinal extent of the pillar.

By the term "open structure" is herein understood to mean a structure having sealed cavities or open cavities, which will be at least be partly occupied by the material of the structure as the structure at least partially collapses when the compression force is applied, for example a compression force that is applied in the longitudinal direction of the pillar As used herein, the terms "pillar" and "collapsible pillar" are used interchangeably and have the same meaning.

Irreversible deformation is a non-elastic deformation that may include plastic deformation of the material and possible strain hardening of the pillar. The deformation of the pillar will be irreversible, for example partially irreversible, and will comprise an elastic deformation, which is reversible and causes the expansion of the pillar when the compression force is released, as well as irreversible deformation of the pillar wherein the expansion in the longitudinal direction of the pillar is less than the reduction when the pillar is subjected to the compression force.

It has been discovered by the present inventors that deviations from evenness, for example waves introduced through processing, in the two glass panes that constitute a VIG-unit may be compensated for by using compressible pillars, which allow for a corresponding variations in the distances between the inner surfaces of the two glass panes of the VIG-unit. The irreversible deformation of the pillars will cause the forces between the pillars and glass panes of the VIG-unit at the points of contact between the pillars and the glass panes to be more homogeneous than with VIG-units having pillars that deform purely elastically during evacuation of the sealed cavity of the VIG-unit, in which case the forces are minimal where the distance between the glass panes were largest prior to the evacuation and maximal where the distance between the glass panes were smallest prior to the evacuation of the sealed cavity.

The pillars are made of any non-outgassing, high strength material such as a metal or a metal alloy as described herein, e.g., a high strength material having a yield stress of preferably at least 1 GPa. In some embodiments, the pillars are made of a material that undergoes both plastic and elastic deformation during the manufacture of the VIG unit when the pillars are compressed between the glass panes. Due to the small size of the pillars and the large compressive stress exerted by the atmospheric pressure, the compressed pillars retain a relatively small amount of elasticity that is sufficient for the pillars to act as springs and to maintain their assigned positions in the finished VIG unit, even when affected by the application and environment in which the VIG unit is installed. Without being bound by theory, the elastic energy stored in the compressed pillars depends on the pillar design, pillar material, and external loading.

The pillar comprises a first end structure (upper part) and a second end structure (lower part) having first and second substantially planar end surfaces (contact surfaces), respectively, for abutting with the glass panes of the VIG unit, wherein the end surfaces extend substantially in parallel to each other and to the glass panes. The collapsible deformable part has an open structure that extends between the first end structure and the second end structure.

The open structure of the pillar is preferably formed so that the first end structure and the second end structure will be mutually displaced towards each other substantially only in the longitudinal direction of the pillar when the pillar is subjected to said compression force acting in the longitudinal direction of the pillar.

When the pillar is in the compressed state, it may become susceptible to shear strain when exposed to a shear force between substantially parallel and substantially planar end surfaces of the pillar suitable that are in abutment with the surfaces of the panes of a VIG unit. The shear strain can be calculated by multiplying a shear factor by the ratio of the shear force to the average area of the first and second substantially planar end surfaces. In some embodiments, the shear factor is preferably less than 55 GPa, preferably in the range of 10 to 50 GPa, such as 18 to 40 GPa, for shear forces of less than 100 N.

With the term "in the compressed state" is herein understood that the pillar is subjected to a compressing force acting on the pillar in the longitudinal direction thereof.

Figure 6:
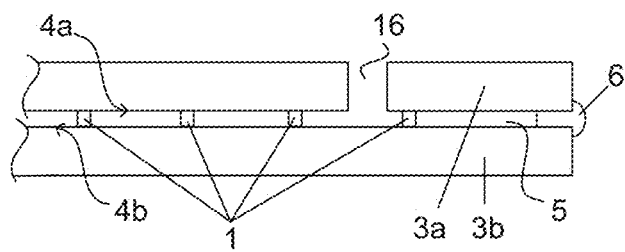
FIG. 6 is a cross-section view of a vacuum insulated glazing (VIG) unit according to an embodiment.

FIG. 1a illustrates a pillar 1 according to embodiments comprising three parts, an upper part 7 and lower part 8 which are similar, and a deformable part 9. The upper part 7 comprises a top contact surface 7a and the lower part 8 comprises a bottom contact surface 8a, wherein both contact surfaces 7a, 8a are disc-shaped and configured to face inner surfaces of the glass panes. FIG. 6 shows the inner surfaces 4a, 4b of the glass panes 3a, 3b of the VIG unit wherein the pillar 1 is disposed in the sealed cavity 5. Returning now to FIG. 1b, the contact surfaces 7a, 8a are substantially planar and parallel to the glass panes, such that a relatively large area of the contact surfaces 7a, 8a are in contact with the glass panes 3a, 3b, and thereby the forces on the glass panes are distributed over preferably an area similar to the extent of the contact surfaces 7a, 8a.

The exemplary pillars 1 shown in the figures, and as exemplified by FIG. 1a, have a pillar diameter (D) at the bottom contact surface 8a of the pillar 1 which is greater than the longitudinal extent (L0) of the pillar in the uncompressed state to prevent the pillar 1 from toppling over. To further stabilize the orientation of the pillar 1, the helix flight height (Lp) is preferably greater than or equal to the height of the upper part (Lu) as well as to the height of the lower part (L1).

In some embodiments, the longitudinal extent (L0) of the pillar in the uncompressed state is preferably within the range of 0.2 mm to 1.2 mm, more preferably in the range of 0.3 mm to 0.8 mm, such as in the range of 0.4 to 0.7 mm.

Figure 1B:
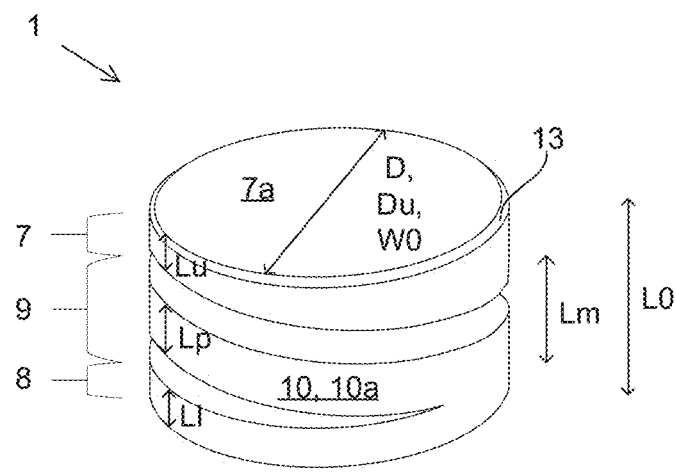
Figure 1C:
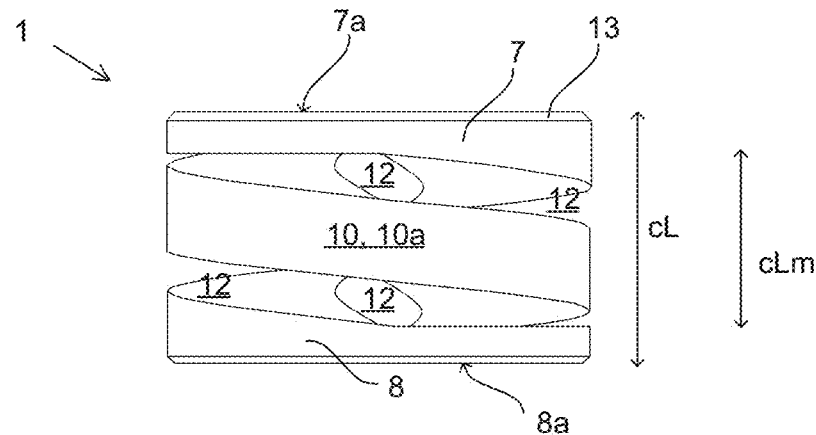
FIG. 1c is a cross-section view of the pillar of FIG. 1a, which is in the compressed state according to an embodiment.

In FIGS. 1a and 1b, the deformable part 9 of the pillar 1 is compressible and has a coil shape or helix structure 10. The helix structure 10 shown in FIGS. 1a-1d comprises a helix flight 10a making a single space curve revolution about a first axis (a1). The first axis a1 is preferably orientated perpendicular to the extent of the upper and lower contact surfaces 7a, 8a as indicated in FIG. 1a. As shown in FIGS. 1a and 1c, due to the helix structure 10, the middle part 9 has an open structure having open zones 12 such as between different parts of the helix structure 10 and between the helix structure 10 and the upper 7 and lower part 8 of the pillar 1.

The compressible pillar may have a deformable part 9 with an open structure that comprises a coil shape, e.g., in the form of a helix. The deformable part 9 of the pillar 1 may alternatively comprise a double helix structure. If the integrity of one of the helix structures fails during compression the other helix structure represent another option for the pillar 1 to maintain a certain degree of elasticity for accommodation for local variations in distance between the glass panes of a VIG unit.

The windings of such coil shapes have helix flight height (Lp), or an extent in the longitudinal direction of the pillar (i.e., substantially perpendicular to the glass panes), that may be in the range of 0.05 mm to 0.2 mm, or 0.05 mm to 0.19 mm, or 0.05 mm to 0.18 mm, or 0.05 mm to 0.17 mm, or 0.05 mm to 0.16 mm, or 0.06 mm to 0.2 mm, or 0.06 mm to 0.19 mm, or 0.06 mm to 0.18 mm, or 0.06 mm to 0.17 mm, or 0.06 mm to 0.16 mm, or 0.065 mm to 0.2 mm, or 0.065 mm to 0.19 mm, or 0.065 mm to 0.18 mm, or 0.065 mm to 0.17 mm, or 0.065 mm to 0.16 mm, or 0.07 mm to 0.2 mm, or 0.07 mm to 0.15 mm, or 0.08 mm to 0.2 mm, or 0.08 mm to 0.15 mm, or 0.09 mm to 0.2 mm, or 0.09 mm to 0.15 mm, or 0.1 mm to 0.2 mm, or 0.1 mm to 0.15 mm, preferably in the range of 0.065 mm to 0.15 mm.

In some embodiments, the helix flight height (Lp) of the coil shape, the height of the upper part (Lu), and the height of the lower part (Ll) are not necessarily uniform about the longitudinal axis (first axis a1) of the pillar 1, for example the height of the element may not be readily apparent at contact points where the coiled portion merges with the upper part at one end and at contact points where the coiled portion merges with the lower part. The average height is generally calculated without including the height measurements at these points. Due to the manufacturing method of these pillars and the small scale on which these are made, the pillars may comprise a surface roughness which also affects the heights measured. The heights measured are therefore the average heights determined from microscopic images.

In FIG. 1b, the width (W0) of the pillar 1 is measured along a second axis a2, and the thickness can be measured along a third axis a3 (not shown). Both the second axis (a2) and the third axis a3 are orientated perpendicular to the first axis (a1) and to each other, as shown in FIG. 1a. In an embodiment, the pillar 1 has a substantially circular cross-section in the plane defined by the second (a2) and third axis (a3) and the pillar 1 is substantially uniform in width (W0) and thickness along the first axis (a1). As shown in FIG. 1b, in some embodiments the width (W0) is equal to the thickness, and the cross-section is of a pillar diameter (D), which is also the diameter of the top contact surface (Du) and bottom contact surfaces (Dl). In one or more embodiments, the cross-section may be of a different shape, such as elliptical, square, or another suitable shape. In an embodiment, the pillar diameter (D) is about 0.5 mm.

Figure 1D:
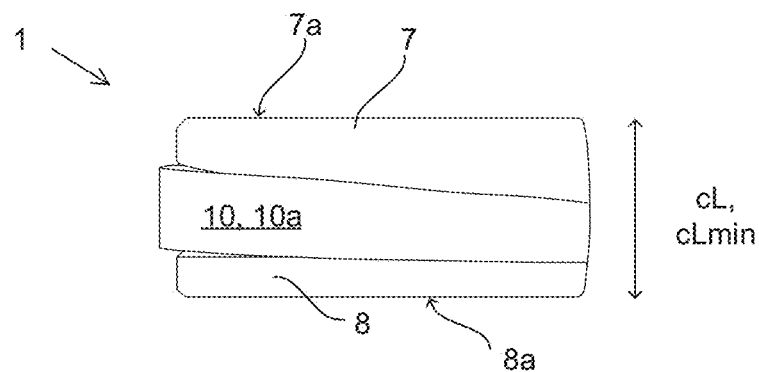
FIG. 1d is a cross-section view of the pillar of FIGS. 1a-c, which is in a further compressed state according to an embodiment.

The overall height of the pillar 1 and the height of different parts and elements of the pillar 1 are each measured along the direction parallel to the first axis (a1), and can alternatively be termed "longitudinal extent". The initial height, or longitudinal extent (L0) of the pillar in the uncompressed state is determined by the sum of the height of the upper part (Lu), the height of the lower part (Ll), and the height of the deformable part (Lm) in their initial, un-compressed configurations. When the pillar 1 is biased or compressed by a force acting substantially perpendicular to the contact surfaces 7a, 8a, the pillar 1 compresses and decreases in longitudinal extent (ΔL, red) to have a compressed longitudinal extent (cL), mainly due to compression of the deformable part 9. Since the deformable part 9 has an open structure including the open zones 12, it is possible to compress the helix structure 10 and thereby decrease the sizes of the open zones 12 in the helix structure 10, such that the height of the middle part (Lm) is decreased to a compressed height of the middle part (cLm). The compression of the deformable part 9 and thereby the pillar 1 as seen from the side is illustrated in FIGS. 1c-1d. Compression of the remaining parts of the pillar 1 may also occur.

In some embodiments, the pillar 1 is shown before (FIG. 1a) and after (FIG. 1d) compression and the height of the pillar is reduced from the longitudinal extent (L0) in the uncompressed state to a compressed pillar height having a compressed longitudinal extent (cL), while still maintaining an amount of elastic energy, such that when the force is released on the pillar 1 the height of the pillar 1 may undergo an increase in longitudinal extent (ΔL, exp) to an expanded longitudinal extent (eL). The reduction or decrease in the longitudinal extent (ΔL, red) is calculated from the difference between the longitudinal extent (L0) in an uncompressed state and the compressed longitudinal extent (cL). The expansion or increase in the longitudinal extent (ΔL, exp) is calculated from the difference between the compressed longitudinal extent (cL) and the expanded longitudinal extent (eL).

In an embodiment, when said compression force is released the pillar will expand in the longitudinal direction with a relative increase or expansion in the longitudinal extent (ΔL, exp/L0) in the range of 0.5% to 50% of the relative decrease or reduction in longitudinal extent (ΔL, red/L0) from compression, preferably in the range of 1% to 35% of the relative decrease, such as in the range of 2% to 25%. The relative increase (ΔL, exp/L0) is calculated by dividing the increase in the longitudinal extent (ΔL, exp) by the longitudinal extent in the uncompressed state (L0), and the relative decrease (ΔL, red/L0) is calculated by dividing the decrease in the longitudinal extent (ΔL, red) by the longitudinal extent in the uncompressed state (L0).

Without being limited by theory, the relative increase or expansion in the longitudinal extent is a measure of the elastic deformation included in the partially irreversible deformation of the pillars according to aspects of the present disclosure, where a suitable amount of elasticity is desired for the pillars to remain in place in the VIG unit during deformations of the VIG unit due to thermal expansion, wind load on the VIG unit, or impact of objects on the VIG unit.

The relative decrease or reduction in the longitudinal extent of the pillar when the pillar is subjected to said compression force can be approximated by multiplying a compression factor (C) times the compression force (F). It is preferred that the compression factor (C) is in the range of $0.8 \cdot 10^{-3}$ $N^{-1}$ to $5.0 \cdot 10^{-3}$ $N^{-1}$, preferably in the range of $1.0 \cdot 10^{-3}$ $N^{-1}$ to $4.0 \cdot 10^{-3}$ $N^{-1}$. The compression factor C can be used to define the relative compression of the pillar as a function of the compression force. The relative reduction of the longitudinal extent of the pillar can be determined according to equation 1:

$$\Delta L, red/L0 = C \cdot F \quad \text{(Equation 1)}$$

For example, with $C = 2 \cdot 10^{-1}$ $N^{-1}$ and a compression force F=150 N, the decrease in the longitudinal extent is equal to 2.10·150=30% of the longitudinal extent prior to compression.

In particular embodiments, the heights of the upper (Lu) and lower part (Ll) can be the same or different, and are each in the range of 0.025 to 0.1 mm, preferably in the range of 0.04 to 0.075 mm. In some embodiments, the heights of the upper (Lu) and lower part (Ll) are each approximately equal, and are each about 0.05 mm. The dimensions of the upper and lower parts of the pillar may be adjusted and reduced in a post-processing procedure after the manufacturing of a pillar element. A reduction of the thickness, i.e., the heights or longitudinal extent of the upper and lower parts may be useful in obtaining a final design of the pillar that in a compressed state may be sufficiently small to allow for the distance between the two glass panes of the VIG unit to decrease when the sealed cavity of the VIG unit is placed under a vacuum. The upper and lower parts have substantially planar surfaces and each independently can have an area in the range of 0.1 to 0.3 mm$^2$.

In some embodiments, the deformable part (9) has a height (Lm) of about 0.5 mm. More generally, the deformable part (9) has a height (Lm) within the range of 0.1 to 11 mm, such as 0.2 to 0.7 mm, preferably in the range of 0.3 to 0.6 mm.

The minimum compressed pillar height (cLmin) is dependent on the number of open zones 12 and the relative amount of the helix structure 10 present in the deformable part 9.

The minimum compressed pillar height (cLmin) can be calculated by multiplying the height of the helix flight (Lp) by the number of helix flights 10a in the helix structure 10, and then adding this number to the height of the upper (Lu) and lower (Ll) disc-shaped parts. Preferably, the minimum compressed height (cLmin) is substantially the same as the minimum distance between the glass panes 3a, 3b. In some embodiments, the minimum distance is about 0.2 mm. Generally, the minimum compressed height (cLmin) is within the range of 0.1 to 0.5 mm, preferably in the range of 0.15 to 0.3 mm. In particular embodiments, the minimum compressed pillar height (cLmin) is less than the minimum distance, e.g., due to the compressibility of the pillar material or due to redistribution of pillar material in the direction along the third (a3) and second axis (a2).

Figure 1E:
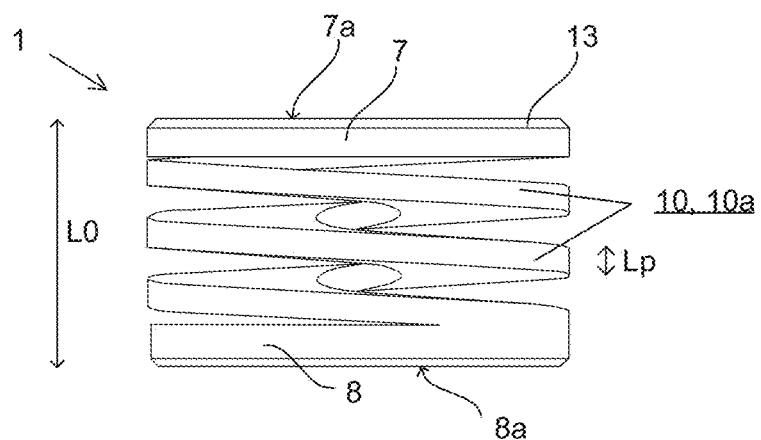
FIG. 1e is a cross-section view of a compressed pillar for use in a VIG unit according to another embodiment, where the pillar comprises a coil-shaped part.

FIG. 1e shows another pillar 1 having a helix flight 10b making a double space curve revolution about the first axis. A helix structure 10 comprising a greater number of helix flights 10a, for example as shown in FIG. 1e, may include a smaller height of the helix flights (Lp) to maintain the minimum compressed pillar height (cLmin), for example at about 0.2 mm.

Figure 1F:
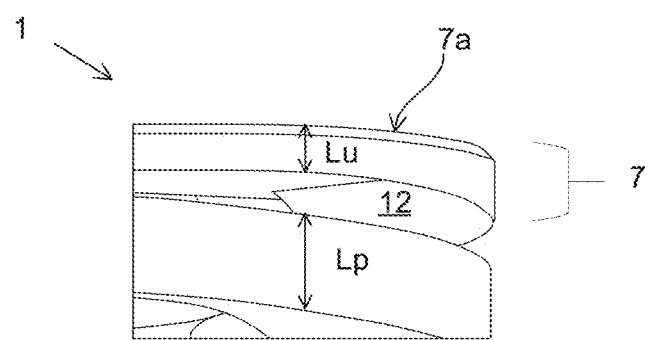
Figure 1G:
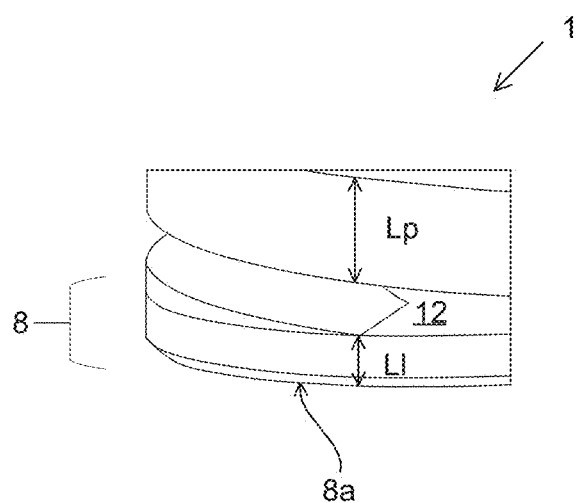

The respective heights of each pillar (L0), (cL), (cLmin), (eL) and pillar elements thereof, e.g., height of the helix flights 10a (Lp), height of the upper part of pillar (Lu), and height of lower part of pillar (Ll) is understood to be an average height of each measured element. For example, minor geometrical mismatches can be present in the pillar 1, where the height of each element may not be readily determined. In some embodiments, the height of the helix flight (Lp) of the helix structure 10, and the height of the upper (Lu) and lower parts (Ll) may not be uniform about the first axis (a1), for example the height of an element may not be precisely known at contact points where the helix structure 10 merges with the upper part 7 at one end and at contact points where the helix structure 10 merges with the lower part 8 at a second end as visualised in FIG. 1f and FIG. 1g, respectively, and thus the average height can be calculated without including the height measurements at these points. The pillars may further comprise a surface roughness that precludes a precise measurement of the element heights.

In particular embodiments, the element heights are average heights as measured from microscopic images of the pillars.

Figure 2A:
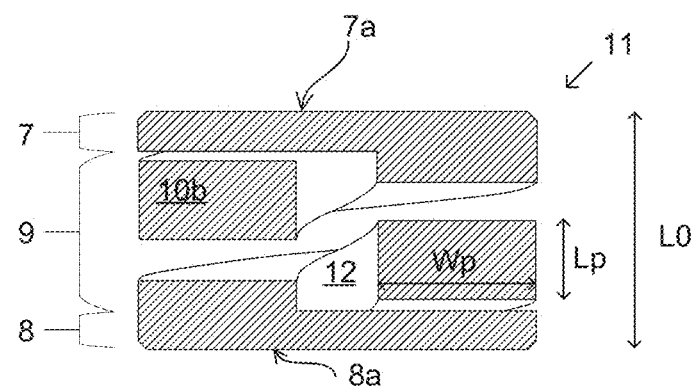
FIGS. 2a to 2d are cross-section views of uncompressed pillars for use in a VIG unit according to embodiments, where the pillars comprises a coil-shaped part.
Figure 2B:
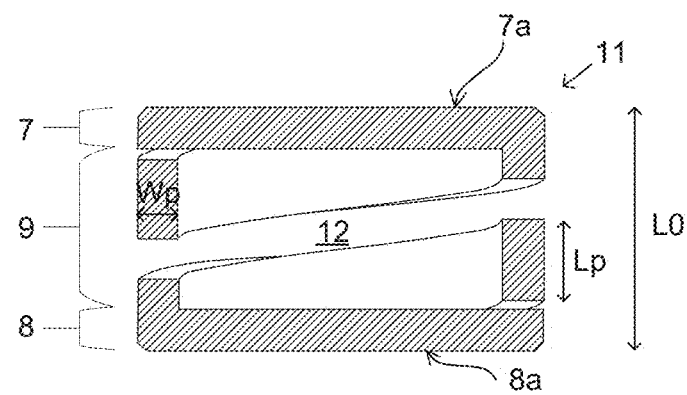
Figure 2C:
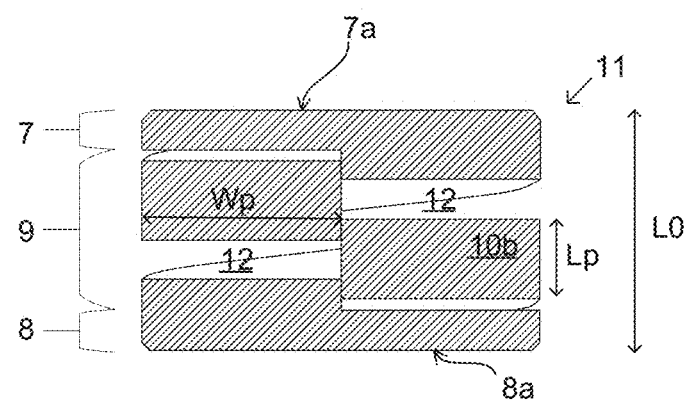
Figure 2D:
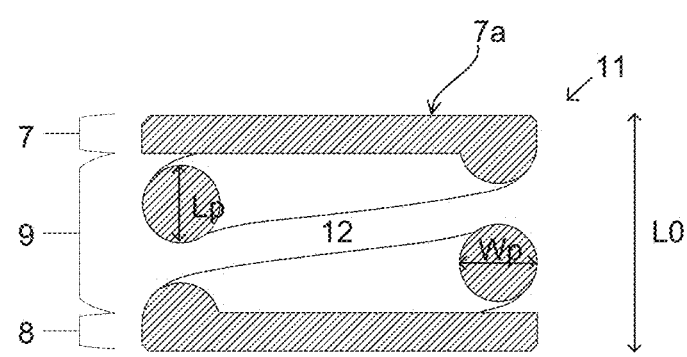

The profile of the helix flight 10b may comprise any shape suitable for the function of the pillar 1. In the present examples shown in FIGS. 1a to 1g, the profile of the helix flight 10b is rectangular-shaped with a radial extent, i.e., a width (Wp) that is greater than the height of the helix flight (Lp). In the present embodiment, the width (Wp) of the helix flight 10b is measured as the length along the second (a2) or the third axis (a3) extending perpendicular to the first axis (a1) due to the substantially uniform width (Wp) of the helix flight 10b about the first axis (a1). In some embodiments, the width (Wp) is about 0.2 mm. As shown in FIGS. 2a to 2c, the width (Wp) may be less than the height of the helix flight (Lp). In other embodiments, the helix flight 10b may be of a different shape than rectangular, for example square, elliptical, or circular. A circular profile of the helix structure 10 is shown in FIG. 2d. Without being bound by theory, the pillar 1 comprises a greater compressive strength when the helix structure 10 has a helix flight profile comprising a width (Wp) that is greater than the height of the helix flight (Lp).

FIGS. 3a, 3b, and 4a to 4c show three embodiments of compressible three-dimensional pillars that are shaped to be substantially uniform in one direction, along the second axis (a3), to facilitate the production of the pillar. Referring to FIG. 6, the pillars (label for convenience as 1) can be disposed in a VIG unit 900 such that they have a substantially uniform shape in a direction substantially parallel to the inner surfaces 4a, 4b when arranged in the VIG unit 900.

Referring back to FIGS. 3a, 3b, and 4a to 4c, the extent of the pillars 1 along the second axis (a2) is the pillar thickness (T0). The longitudinal extent (L0) in the uncompressed state, the longitudinal extent (cL) in the compressed state, the expanded longitudinal extent (eL), and the minimum compressed pillar height (cLmin) are measured as the largest distance between the top contact surface 7a to the bottom contact surface 8a along the first axis (a1). The pillar width (W0) along the third axis (a3) is measured as the largest distance from a first side of the pillar 1 to a second side of the pillar 1. In some embodiments, the pillar thickness (T0) and the pillar width (W0) are both greater than the longitudinal extent (L0) in the uncompressed state.

Figure 3A:
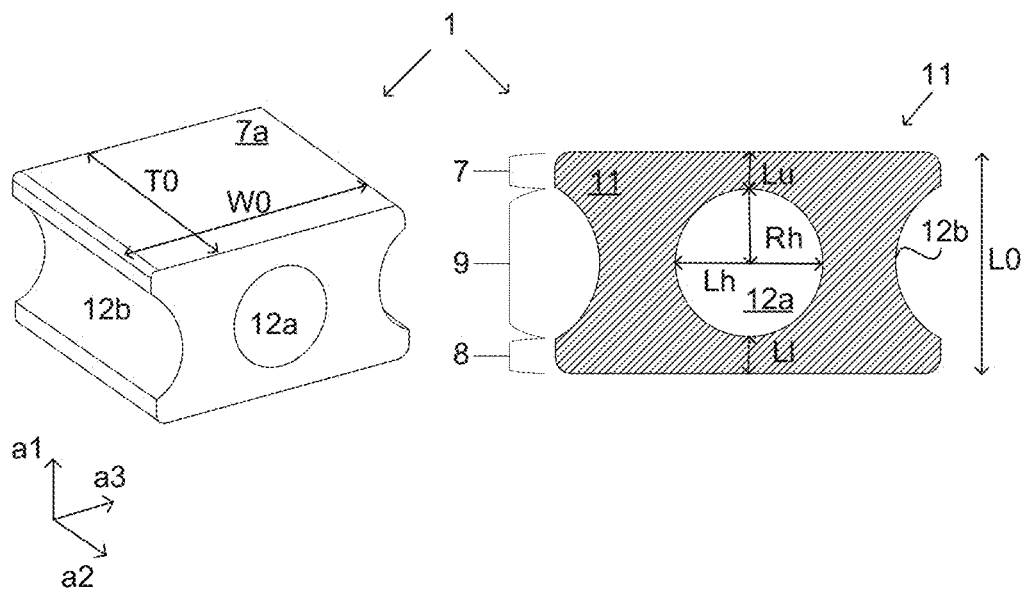
FIG. 3a is a perspective view and a cross-section view of a pillar in the uncompressed state according to an embodiment.

A pillar profile 11 representing a cross section of the pillar 1 defined by the first (a1) and third axis (a3) is shown in FIG. 3a. The pillar profile 11 shows the upper part 7, deformable part 9, and lower part 8 of the pillar. The upper part 7 and the lower part 8 each comprises a contact surface 7a, 8a, respectively, with each arranged to be in contact with the inner surfaces 4a, 4b of one of the respective glass panes. The deformable part 9 of the pillar 1 comprises two structures separately connecting the first end structure 7 and the second end structure 8 and surrounding an open zones 12 facilitating compression of the pillar 1 under an applied longitudinal force. In FIG. 3a the open zones 12 comprise a hole 12a disposed substantially in the center of the deformable part 9 and grooves 12b at each side of the pillar profile 11 in the deformable part 9. The grooves 12b may have an inwardly curved shape making the pillar width (W0) near the top and the bottom of the pillar profile 11 greater than the pillar width at the deformable part 9 of the pillar profile 11. In an embodiment, the radius of the hole (Rh), which is defined as the radius of the hole 12a, can be between 100 to 120 microns and the narrowest width of the profile wall (Wp), measured along the third axis (a3) from the hole 12a to the groove 12b is between 100 to 120 microns. Larger or smaller holes 12*a* and larger or smaller widths of the profile wall (Wp) on each side of the hole 12*a* may also be manufactured.

Figure 3B:
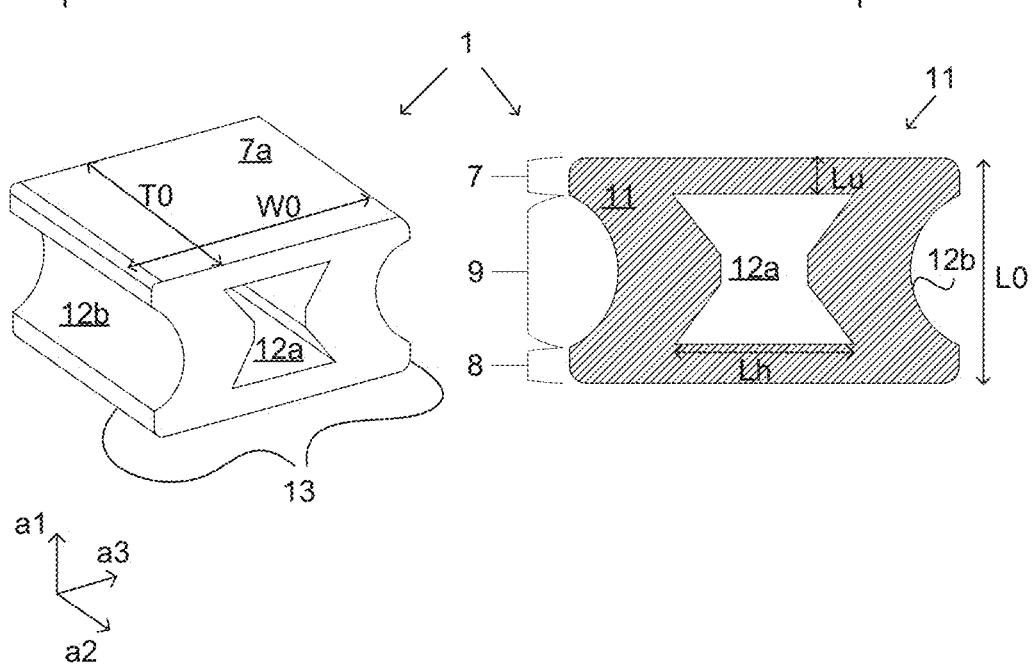
FIG. 3b is a perspective view and a cross-section view of a pillar in the uncompressed state according to an embodiment.

FIG. 3*b* shows a cross-section for another pillar 1 comprising a hole 12*a* having a more complex, non-circular shape similar to two trapezoids orientated in a mirrored configuration and bridged by a small rectangular section at the smallest width of each trapezoid. The largest width of the hole (Wh) is near the upper and lower regions of the hole 12*a* where the hole 12*a* comprises a hole width (Wh), which may be between 200 to 240 microns wide. Each side of the pillar profile 11 may comprise a groove 12*b* that curves inwardly, making the shape of the side of the pillar profile 11 substantially concave. The pillar profile 11 has sides which constitute two knee structures which may allow compression to controllably squeeze the pillar height, while the hole 12*a* provides an open structure, which allows the knee structures to move.

Figure 4A:
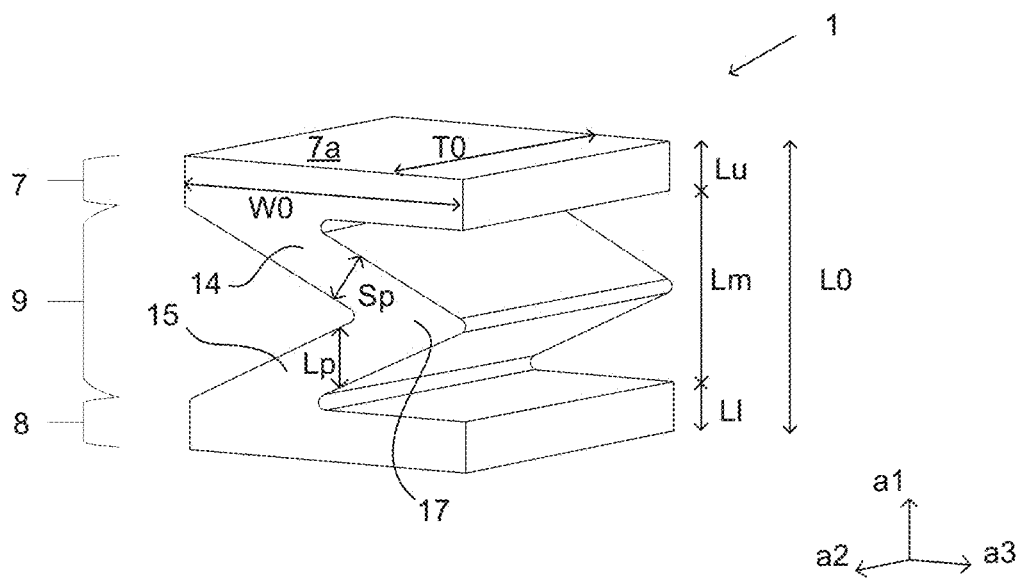
FIG. 4a is a perspective view of a pillar having a capital sigma shape in the uncompressed state according to an embodiment.
Figure 4B:
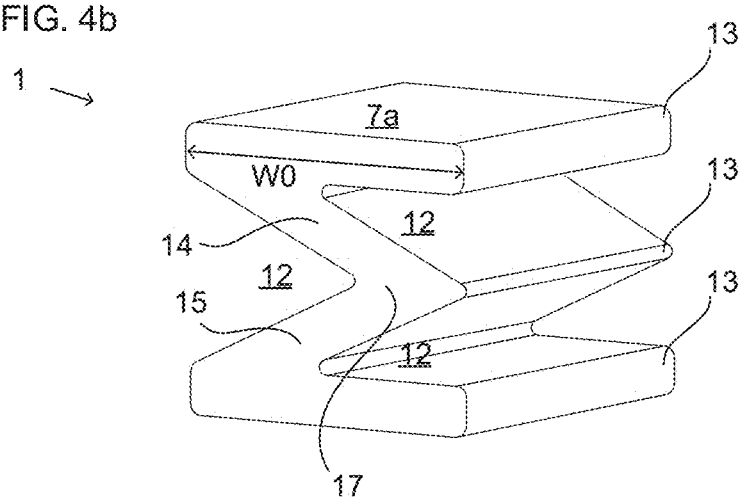
FIG. 4b is a perspective view of a pillar having a capital sigma shape in the uncompressed state according to an embodiment.
Figure 4C:
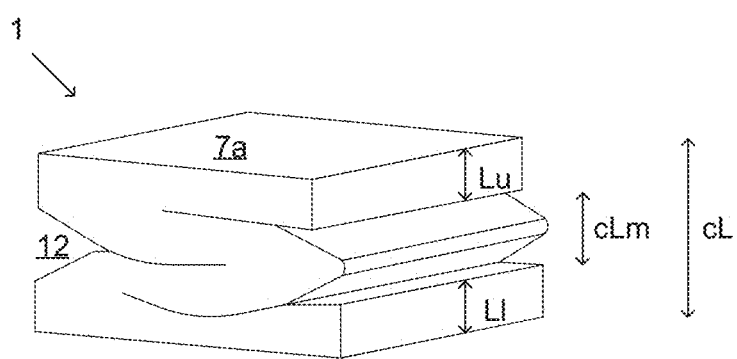
FIG. 4c is a perspective view of the pillar of FIG. 4a in the compressed state according to an embodiment.

FIG. 4*a* shows another embodiment of a pillar 1 that does not have open zones in the form of an enclosed hole or mirrored trapezoid. FIG. 4*c* shows the compressed state of the pillar 1 as shown in FIG. 4*a*. As shown in FIGS. 4*a* and 4*c*, the pillar 1 is substantially shaped as a capital Greek alphabet letter "Σ" (sigma), similar to the English alphabet letter "M" but rotated 90 degrees counter clockwise, such that the upper and lower parts 7, 8 are arranged substantially parallel to the inner surfaces 4*a*, 4*b* of the first and/or second glass panes when the pillar 1 is arranged in the VIG unit 900. Without being bound by theory, when a pillar having a sigma shaped structure is subjected to a compression force in the longitudinal direction of the pillar, it can collapse substantially in the longitudinal direction in a manner that allows the two end structures to remain parallel and without displacing the end structures in a direction perpendicular to the longitudinal direction of the pillar.

The upper and lower parts 7, 8 comprise the upper contact surface 7*a* and lower contact surfaces 8*a*, respectively. A first element 14 of the deformable part 9 of the pillar 1 extends from the upper part 7 at a first angle relative to the first axis a1 towards the lower part 8 and is connected to a second element 15 that extends from the lower part 8 at a second angle to the longitudinal direction a1 towards the upper part 7, where the first and the second angles are substantially similar but of opposite directions. The first element 14 and the second element 15 of the deformable part 9 of the pillar 1 are jointed in a joining part 17 of the deformable part 9. The pillar 1 can comprise open zones 12 defined as the regions between the elements 7 and 14, 14 and 15, and 8 and 15. In a particular embodiment, the longitudinal extent (L0) in the uncompressed state is about 400 microns as measured along the first axis (a1) and the pillar thickness (T0) is about 460 microns as measured along the second axis (a2). The pillar width (W0) measured along the third axis (a3) also can be about 460 microns. The pillar profile for pillar 1 has a deformable part 9 which constitutes a knee structure which may allow compression to controllably squeeze the pillar height.

In still other embodiments, the top and bottom contact surfaces 7*a*, 8*a*, which are arranged to face the inner surfaces 4*a*, 4*b*, are substantially planar in order to facilitate a good and uniform contact with the inner surfaces 4*a*, 4*b* of the glass panes 3*a*, 3*b*. In a particular embodiment, the height of the upper part (Lu) and lower part (Ll) are about 70 microns each, measured along a line perpendicular to the contact surface of the pillar profile structure to the open zone, which in the present embodiment is along a line parallel with the first axis (a1). In certain embodiments, the deformable part 9 has a V-shape and comprises a wall size (Sp) of about 75 microns, measured as the width of the first and second elements 14, 15 along a line perpendicular to the outlines of the V-shaped structure. In another embodiment, the height of each upper (Lu) and lower part (Ll) are about 100 microns and the deformable part 9 comprises a wall size (Sp) of about 80 microns. In particular embodiments, the longitudinal extent (L0) in the uncompressed state is about 400 microns while the pillar width (W0) is about 300 microns, and the pillar thickness (T0) is about 480 microns.

In some embodiments, at positions where the upper part 7, deformable part 9, and lower part 8 connect to form the V-shaped part of the sigma structure, the height and width may be larger or smaller, e.g., for the V-shaped part of the sigma structure, the height at the point where the first and second elements 14 and 15 of the V-shape are joined, the wall height (Lp) is about 200 microns when measured along the first axis (a1). Additionally, the width of the wall (Wp), measured along the third axis (a3) is also larger at this position.

The deformable part 9 is compressible such that as pressure is applied to the contact surfaces 7*a*, 8*a* of the pillar 1, the contact surfaces 7*a*, 8*a* are forced towards each other, preferably along the first axis (a1) and the deformable part 9 compresses and experiences a reduction in the longitudinal extent (ΔL, red), resulting in an overall reduction of the pillar height to a compressed longitudinal extent (cL) and a reduction of the height of the deformable part 9 to a compressed height (cLm). During compression, the size of the open zones 12 can decrease, as shown for as shown in FIG. 4*c*. In some embodiments, the pillar 1 is shown before (FIG. 4*a* and after (FIG. 4*c*) compression and the height of the pillar is reduced from the longitudinal extent (L0) in the uncompressed state of about 400 microns to a compressed pillar height having compressed longitudinal extent (cL) of about 235 microns, while still maintaining an amount of elastic energy, such that when the force is released on the pillar 1 the height of the pillar 1 may undergo an increase in longitudinal extent (ΔL, exp) to an expanded longitudinal extent (eL). Without being bound by theory, the pillar 1 is compressed over itself thereby increasing its stiffness and stability under atmospheric pressure.

The pillar structure may comprise chamfered edges 13, e.g., to reduce the occurrence of a sharp contact between the top and bottom contact surfaces (7*a*, 8*a*) of the upper part 7 and the lower part 8 and the inner glass surfaces 4*a*, 4*b* of the glass panes. This in turn may decrease the possibility of indention related damage on the glass. An example of a chamfered pillar structure is shown in FIG. 4*b*, where the pillar 1 has the same features as pillar 1, but where the edges 13 are rounded.

Figure 5A:
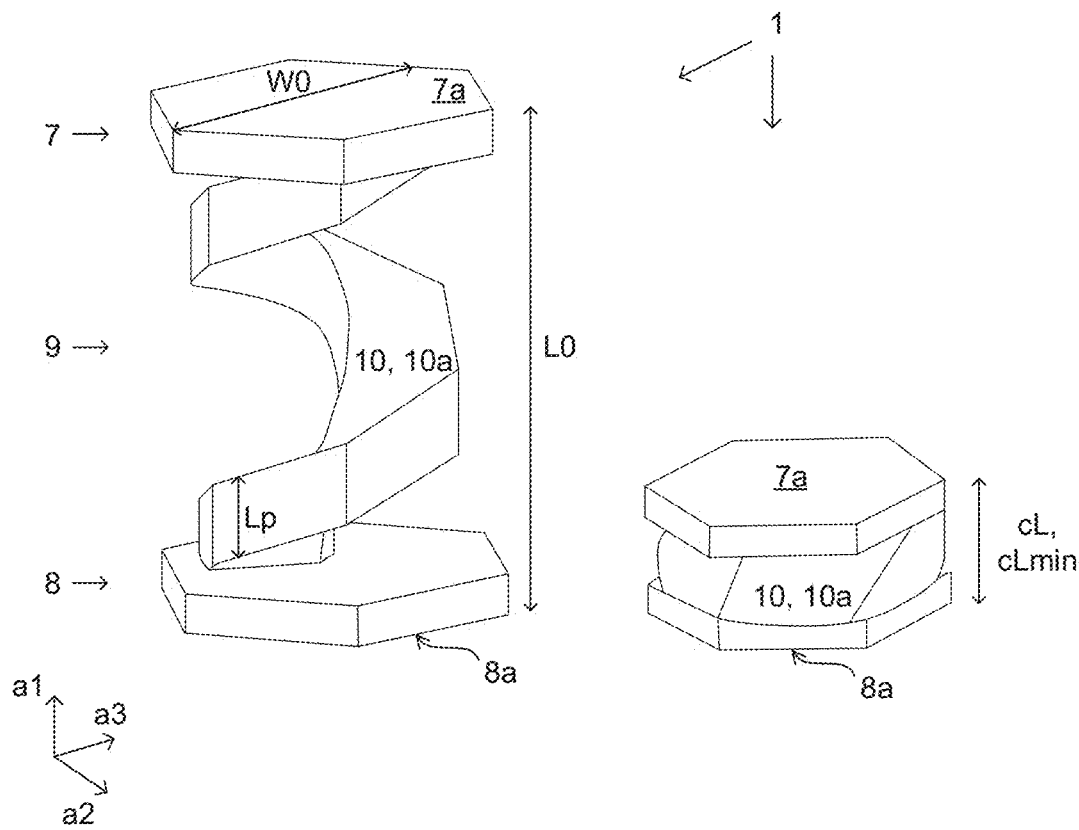
FIG. 5a are a perspective views of a pillar comprising a coil-shaped deformable part in the uncompressed state and the compressed state according to an embodiment.

In another embodiment, a pillar 1 comprises a coil-shaped deformable part 9 as shown in FIG. 5*a* in the uncompressed state (left) and in the compressed state (right). The structure of the pillar 1 is similar to those shown in FIGS. 1*a* to 1*g*, except that the upper part 7 and the lower part 8 of the pillar 1 have a hexagonal shape and the deformable part 9 has a helix structure 10 that corresponds to this hexagonal shape when the pillar 1 is compressed.

Figure 5B:
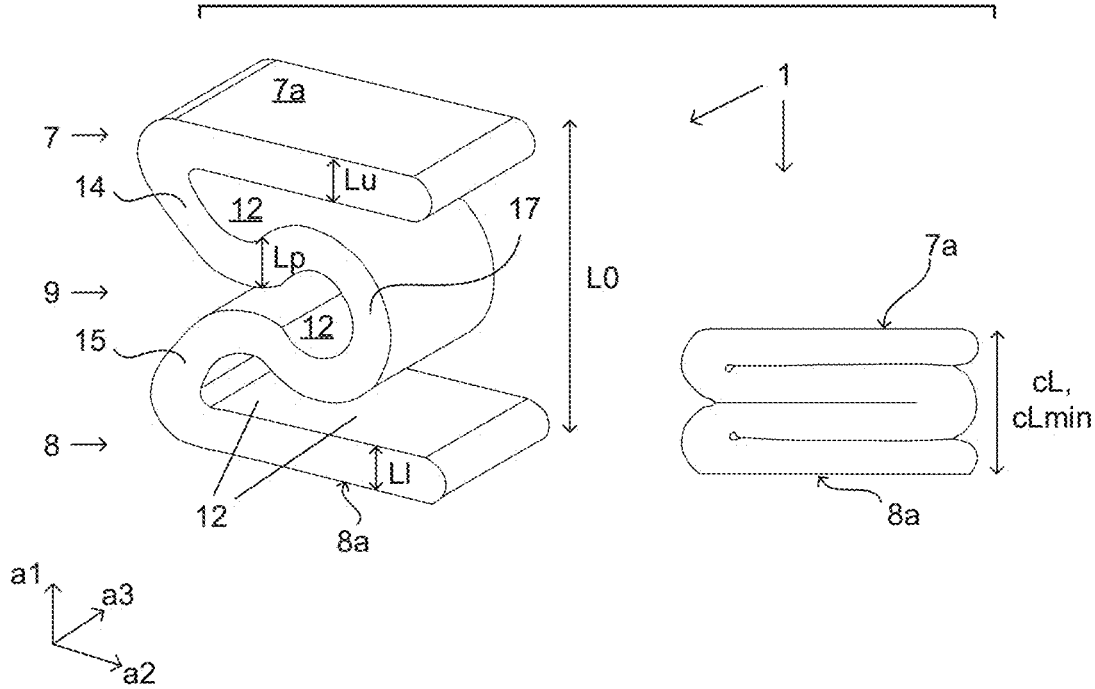
FIG. 5b are a perspective views of a pillar comprising a capital sigma shaped deformable part in the uncompressed state and the compressed state according to an embodiment.

In still another embodiment, pillar 1 comprises a sigma shape as shown in FIG. 5*b*. The structure of pillar 1 is similar to those shown in FIGS. 4*a*-4*c*, except the first and second elements 14, 15 of the deformable part 9 of the pillar 1 has curved connections between each of the upper and lower parts 7, 8 to the first and second elements, respectively, and the connection between the joining part 17 and the ends of the first and second elements 14, 15 have a partially annular cross-section with a curved transition to the first and second elements 14, 15. Thus, the sharper edges and transitions between the various parts 7, 8, 14, 15, 17 of the capital sigma shaped pillar of FIGS. 4*a* and 4*b* have been modified with curved transitions in the pillar 1 of FIG. 5*b*. The pillar 1 also may provide a shape having a suitable plastic deformation response when subjected to compression force in the longitudinal direction. In a particular embodiment, the height (Lp) of the deformable part 9 of this embodiment, i.e., of the first and second elements 14, 15 and of the joining part 17, is about 80 microns and the longitudinal extent (L0) of the pillar 1 prior to compression thereof is about 600 microns with a minimum compressed height (cLmin) of about 317 microns.

In still other embodiments, the pillar can have other dimensions. In a particular embodiment, the shape of the pillar can be a "double-sigma" with a capital sigma joined with a mirrored capital sigma.

The compressible pillars 1 are for providing and maintaining a distance between a first glass pane 3*a* and a second glass pane 3*b* in vacuum insulated glazing (VIG) unit 900, as shown in FIG. 6. The glass panes 3*a*, 3*b* are disposed in a face-to-face configuration, such that a sealed cavity 5 is created by arranging a peripheral seal 6 around the edges, between the glass panes 3*a*, 3*b*. Each glass pane 3*a*, 3*b* in the VIG unit 900 comprises an inner surface 4*a*, 4*b* and outer surface where the inner surfaces 4*a*, 4*b* is characterised as the surfaces facing the sealed cavity 5. Ideally the sealed cavity gap, i.e., the distance between the glass panes 3*a*, 3*b* in the VIG unit 900 is uniform, but during the production of glass panes, the resulting glass panes 3*a*, 3*b* may not comprise completely planar pane surfaces. The surface variation may depend on the quality of the glass panes 3*a*, 3*b* and the manufacturing methods used to make the glass panes 3*a*, 3*b*, e.g., tempered glass panes may comprise relatively large surface variations across the pane. The glass panes 3*a*, 3*b* may be orientated and aligned in different ways, but in all of the configurations of the panes, the sealed cavity height or distance between the glass panes 3*a*, 3*b*, will be non-uniform in the VIG unit 900.

According to some embodiments, the VIG unit 900 is made using tempered glass panes 3*a*, 3*b*, which comprise a significant flatness deviation resulting from the toughening process, such as roller wave distortion which occurs when the soft glass is in contact with rollers in a horizontal toughening process. When two glass panes 3*a*, 3*b* are arranged in parallel, one above the other, the distance between two tempered glass panes 3*a*, 3*b* may vary significantly across the panes, so that pillars 1, such as pillars 1 of at least two different pillar heights are appropriate for properly maintaining the sealed cavity 5.

Any suitable glass can be used for the glass panes, for example a soda lime silica glass or an alkali aluminosilicate glass. The glass panes can have the same or different thickness, and the thickness can be 1 to 6 mm, preferably 2 to 4 mm, more preferably 2.5 to 3.5 mm. The glass panes are substantially transparent to visible light (i.e. at least about 50% transparent, more preferably at least about 70% transparent, more preferably at least about 80% transparent, and most preferably at least about 90% transparent), although they may be tinted in some embodiments.

The glass panes 3*a*, 3*b* can be annealed and/or tempered to increase strength. The term "tempered glass pane" as used herein is understood to mean a glass pane in which compressive stresses have been introduced into the surface(s) of the glass pane. For glass to be considered strengthened this compressive stress on the surface(s) of the glass can be a minimum of 69 MPa (10,000 psi) and may be higher than 100 MPa.

The glass panes can be annealed, for example annealed at a temperature of at least 375° C. Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass pane. After tempering, the stress developed by the glass can be high, and the mechanical strength of tempered glass can be four to five times greater than that of annealed glass.

Thermally tempered glass may be produced by means of a furnace in which an annealed glass pane is heated to a temperature of approximately 600-700° C., after which the glass pane is rapidly cooled. The cooling introduces the compressive stresses into the glass pane surface(s).

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which causes the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane. Methods of plasma tempering are disclosed e.g. in US 2013/0059087 A1 and in US 2013/0059160 A1.

The VIG unit can also include an evacuation port on an outer surface of one of the glass panes. Alternatively, an evacuation port of a suitable kind may be provided in the peripheral seal between the two glass panes. The sealed cavity is evacuated through the evacuation port, wherein the evacuation port is sealed after evacuation of the sealed cavity. In some embodiments, the VIG unit is heated to a temperature of at least 250° C., preferably to at least 300° C., prior to sealing the evacuation port.

Low gaseous thermal conduction may be achieved when, for example, the pressure in the sealed cavity is reduced to a level equal to or below about $10^{-5}$ bar, more preferably below $10^{-6}$ bar, and most preferably below $10^{-7}$ bar of atmospheric pressure.

The pillars 1 can be used in the production of a VIG unit, for example the VIG unit 900 shown in FIG. 6, by first placing the pillars 1 on an inner surface of the first glass pane 3a, whereby the second glass pane 3b is placed on top such that the pillars 1 are spaced therebetween. Upon evacuation of the sealed cavity 5 between the glass panes 3a, 3b, e.g., through an evacuation port 16 in glass pane 3a, the glass panes 3a, 3b move towards each other and both glass panes 3a, 3b come into contact with the pillars 1 that are spaced therebetween. As the glass panes 3a, 3b continuously move towards each other during the evacuation, the pillars 1 may start to be compressed and sandwiched between the glass panes 3a, 3b until a desired pressure is reached in the sealed cavity 5 and the evacuation process is terminated, whereby the VIG unit 900 is sealed. The compressible pillars 1 are used to maintain the distance between the glass panes 3a, 3b in the VIG unit 900 and to accommodate changes in the distance between the glass panes 3a, 3b due to, e.g., an impact or thermal influences.

The pillars 1 may be disposed on the glass pane 3a with an inter-pillar spacing that is the same or different, and may be 15 to 120 mm, or 25 to 80 mm, or 15 to 50 mm, or 30 to 60 mm, or preferably 30 to 45 mm, as measured from either the outer edges or center points of adjacent pillars.

The side edges of the VIG unit 900 are sealed with a side edge or peripheral seal 6 that is attached around the periphery of the first glass pane and the second glass pane and forms a sealed cavity between the glass panes. The side seal material forms a hermetic seal and substantially eliminates any ingress or outgress of gas or air to/from the sealed cavity. Any suitable side seal material can be used, including solder glass, indium, Ostalloy 313-4, 99% indium (In) wire available from Arconium (Providence, R.I.), liquid glass (i.e., glass composition with water in it when applied, wherein the water evaporates when heated to form the seal), rubber, silicone rubber, butyl rubber, Indalloy No. 53 available from Indium Corp. in paste form having a composition of 67% Bi and 33% In (% by weight), Indalloy No. 1 from Indium Corp. in paste form having a composition of 50% Sn, Indalloy No. 290 available from Indium Corp. in paste form having a composition of 97% In and 3% Ag, Indalloy No. 9 from Indium Corp. in paste form having a composition of 70% Sn, 18% Pb and 12% In, Indalloy No. 281 available from Indium Corp. in paste form having a composition of 58% Bi and 42% Sn, Indalloy No. 206 available from Indium Corp. in paste form having a composition of 60% Pb and 40% In, Indalloy No. 227 available from Indium Corp. in paste form having a composition of 77.2% Sn, 20% In, and 2.8% Ag, Indalloy No. 2 available from Indium Corp. in paste form having a composition of 80% In, 15% Pb and 5% Ag, Indalloy No. 3 available from Indium Corp. in paste form having a composition of 90% In and 10% Ag, or any other suitable material. The side seal material can be a soldering material, for example a glass solder frit with a low melting temperature, wherein thermal treatment can be used to hermetically seal the periphery of the VIG unit. For example, the side seal material may comprise a glass solder frit paste with a low melting temperature, where the paste further comprises of about 70 wt % of an organic binder, inorganic fillers, and solvents, for example water or alcohol. In an embodiment, the frit material includes vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or a combination thereof. The soldering material may be provided as a combination of two different materials comprising glass solder frit with different thermal expansion coefficients that are adjusted to correspond to the thermal expansion coefficients of the bonded parts. Also several solder materials may allow pre-sintering of a first solder to the glass surface and subsequently use of a second solder to join to the first solder. Examples of seals are shown in WO 02/27135 and EP 1 422 204. Alternatively, other materials may be employed, such as a metal band seal as disclosed e.g. in US 2015/218877.

Figure 7:
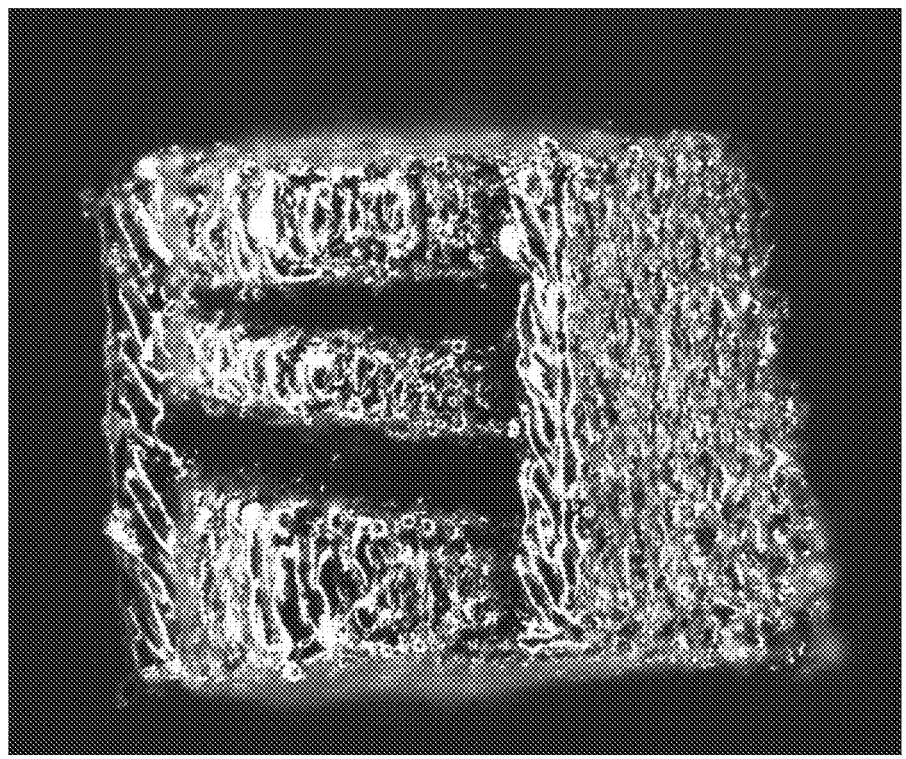
FIG. 7 is a microscope image of the pillar of FIGS. 1a to 1g in the uncompressed state.

FIG. 7 shows an image of a pillar having a structure according to the pillar structure shown in FIGS. 1a-g. The image is a microscopic image of a pillar manufactured to dimensions as disclosed herein. The pillar has an upper part, deformable part, and a lower part, where the deformable part comprises a coil-shaped structure having open zones that can become increasingly smaller as pressure is applied to the pillar from above or below at the upper contact surface or the lower contact surface.

Figure 8C:
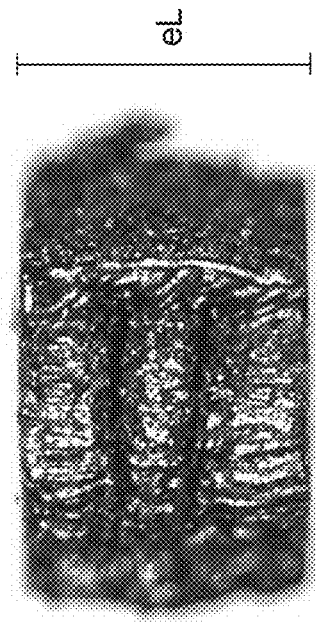
FIGS. 8b and 8c are microscope images of the pillar of FIG. 8a in the compressed state.
Figure 8B:
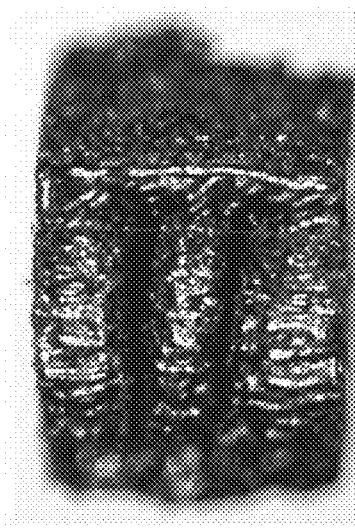
Figure 8A:
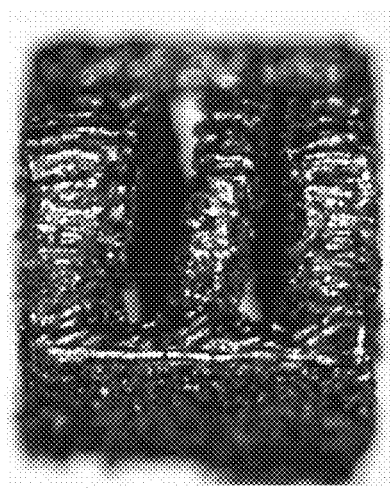
FIG. 8a is a microscope image of the pillar of FIG. 7 in the uncompressed state.

FIGS. 8a-c show images of a pillar having a structure as shown in FIG. 7, at three different stages of compression. The first figure, FIG. 8a, shows an uncompressed pillar structure with a coil-shaped deformable part. As compression force is applied to the structure along a direction perpendicular to the upper and lower contact surfaces, the coil-shaped deformable part compresses and the open zones between wall elements of the structure are decreased in size (FIG. 8b) until they are almost completely eliminated due to further compression as shown in FIG. 8c. The height of the pillar structure in FIG. 8c is given the expanded longitudinal extent of the pillar when the compression force on the pillar is lifted (eL).

Figure 9A:
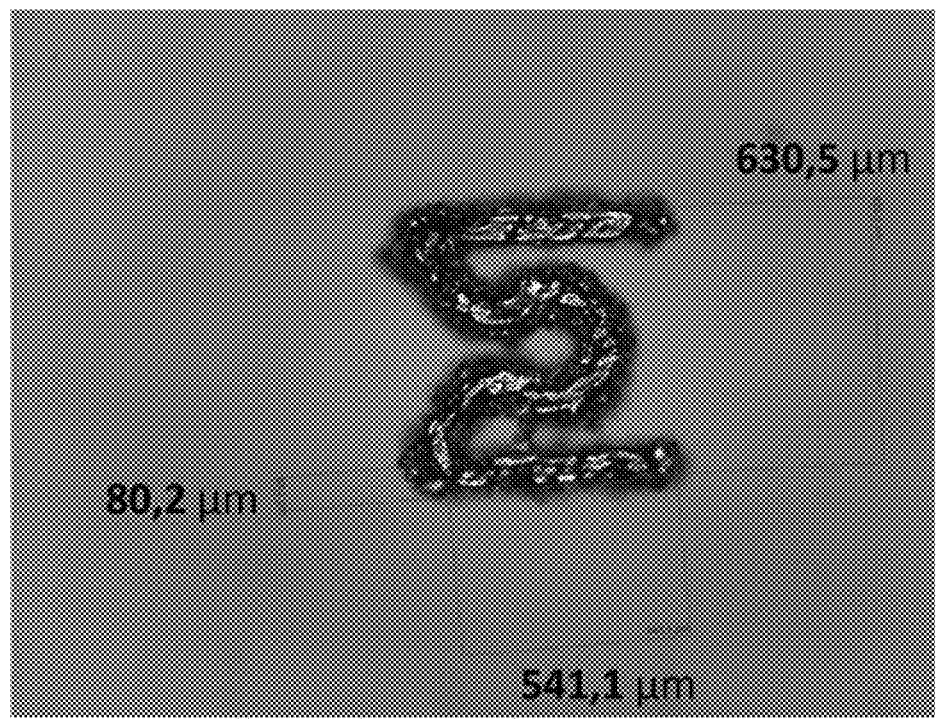
FIG. 9a is a scanning electron microscope (SEM) picture of a sample of a pillar of the type shown in FIG. 5b.
Figure 9B:
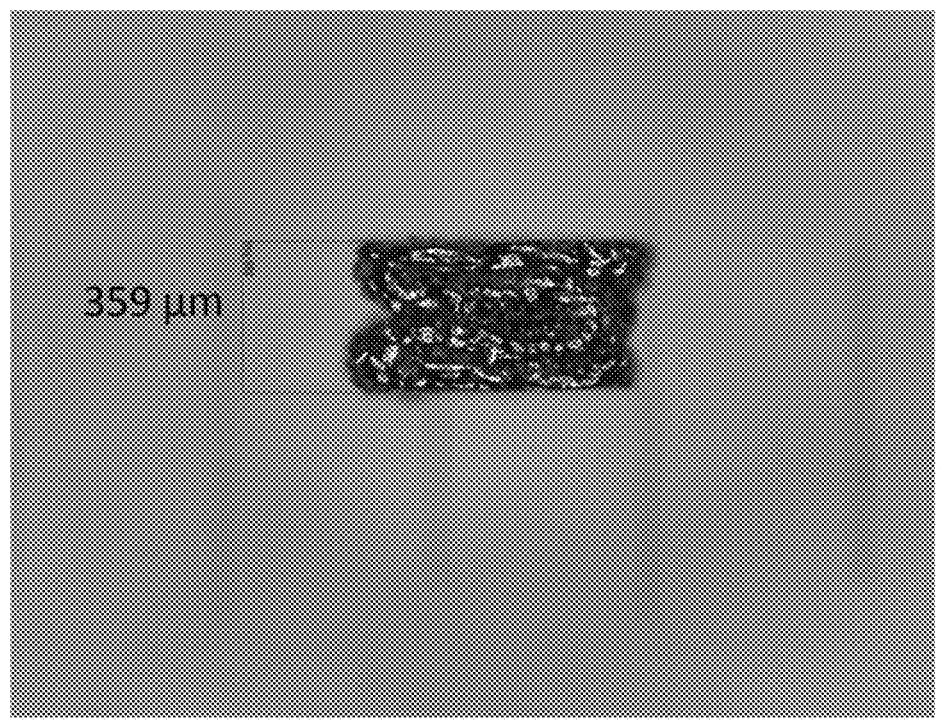
FIG. 9b, is a SEM picture of the pillar of FIG. 9a after a compression force has been applied to the longitudinal direction of the pillar and subsequently has been lifted.
Figure 9C:
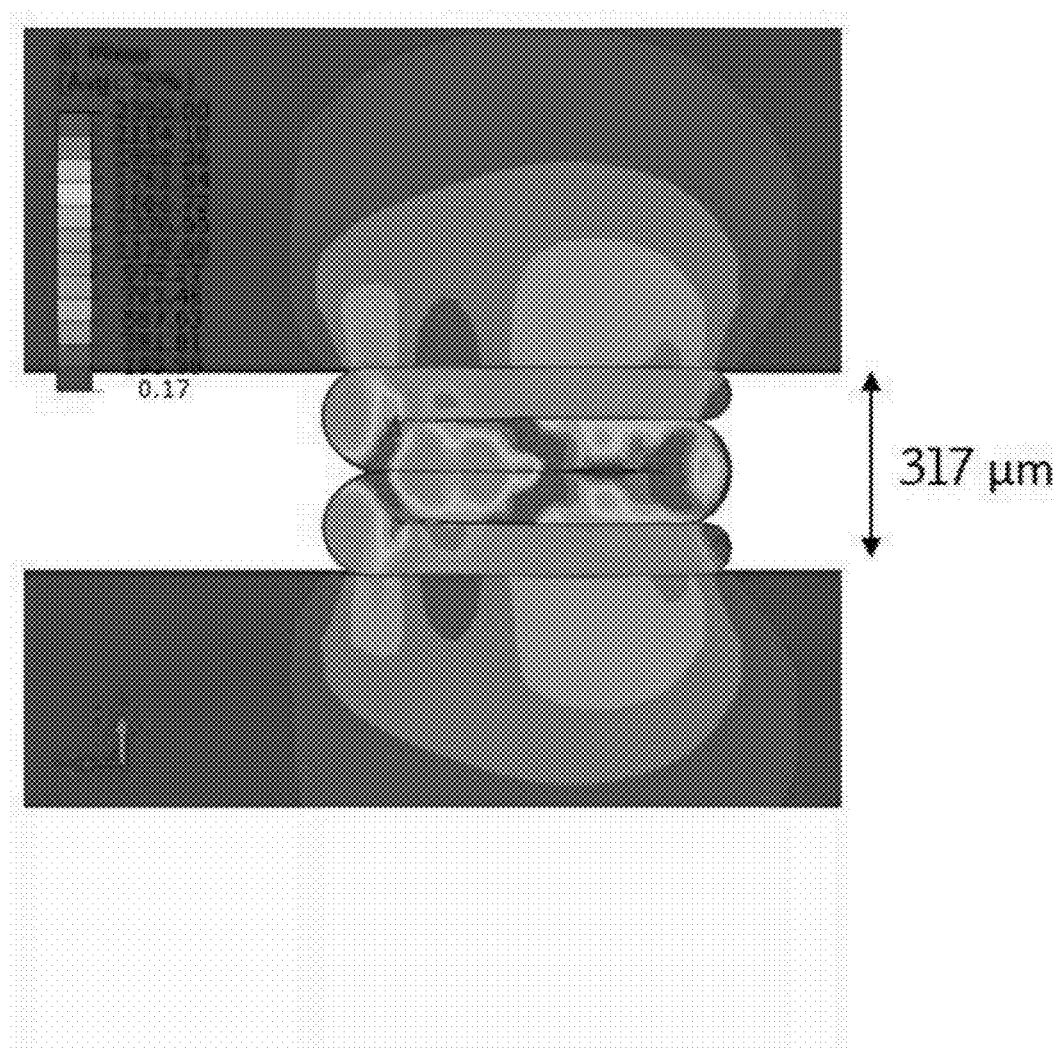
FIG. 9c shows a model simulation of the type and size of a pillar shown in FIGS. 9a and b with a compression force applied.

A scanning electron microscope (SEM) picture of a sample of a pillar 1 of the type shown in FIG. 5b can be found in FIG. 9a. The actual longitudinal extent L0 of the uncompressed pillar is measured to 930.5 μm, the width W0 of the bottom contact surface 8a is measured to 541.1 μm, whereas the height L1 of the lower part 8 of the pillar 1 is measured to 80.2 μm. In FIG. 9b, a SEM picture of the pillar 1 is shown after a compression force F has been applied to the longitudinal direction of the pillar and subsequently has been lifted. The longitudinal extent eL of the pillar 1 has in this situation been measured to 359 μm. The compression force F was equivalent to the compression force exerted on pillars with a mutual spacing of 40 mm by an atmospheric outer pressure and a pressure in the void being neglectable, so that the compression force F is of a magnitude of about 160 N. A model simulation of the same type and size of a pillar 1 is shown in FIG. 9c with a compression force of 160 N applied and the longitudinal extent cL of the pillar in the compressed stated is computed to be 317 μm. The numbers from FIGS. 9b and 9c provides an indication that the pillar 1 will expand about 42 μm ΔL, exp in its longitudinal direction when said compression force F is lifted which constitutes about 13% of the reduction of 313 μm in the longitudinal extend of the pillar when the compression force F is applied to the pillar and which would also constitute about 13% of the relative reduction in the longitudinal extend of the pillar. Thus, it is indicated that the pillar when the compression force is lifted has a relative expansion in the longitudinal direction of the pillar of 13% of the relative reduction of the longitudinal extend of the pillar caused by the application of the compression force F.

Figure 10A:
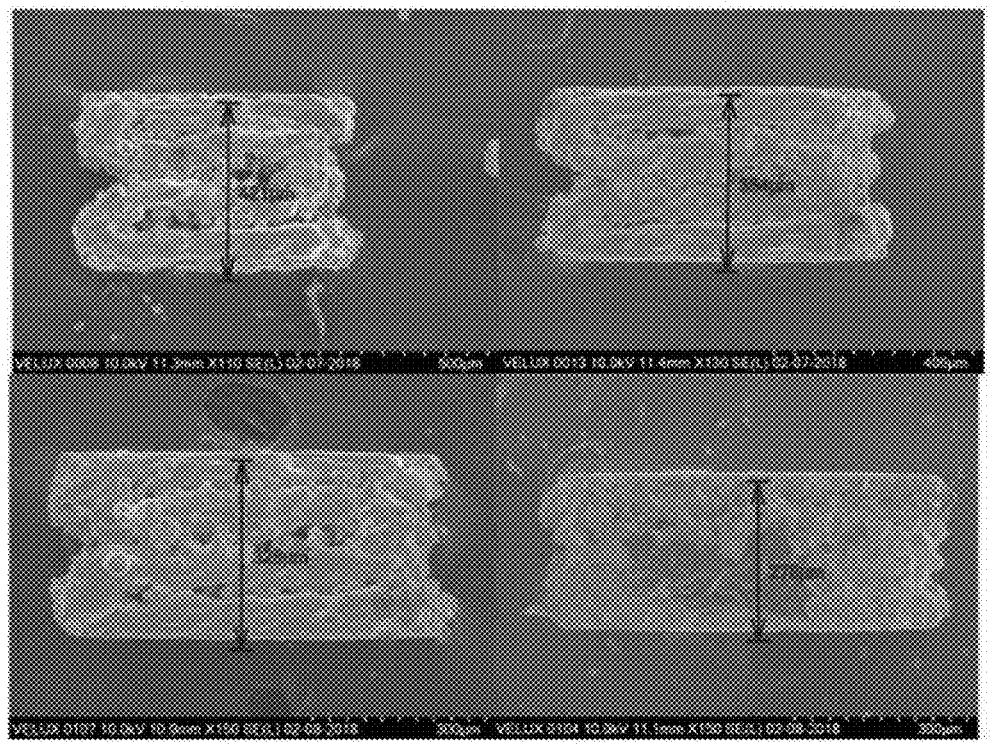
FIG. 10a shows SEM pictures of four examples of compressed pillars.
Figure 10B:
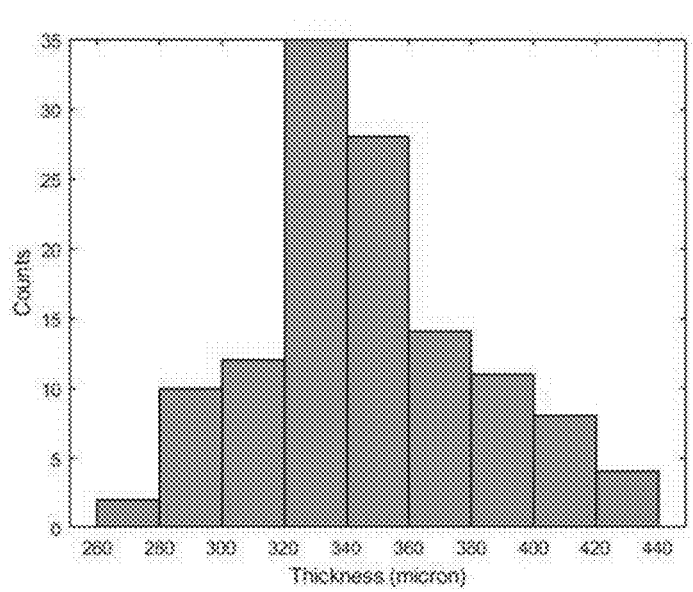
FIG. 10b is a histogram of the longitudinal extent eL of 124 pillars.

A test of 140 pillar of the type shown in FIG. 5a and FIG. 9a was conducted, where the pillars 1 were used to manufacture a VIG-unit using a mutual spacing of the pillars of 40 mm. The panes were made from thermally tempered glass, wherein the tempering has caused a deviation of the surface of the panes from absolute plane surfaces, known as roller waves or roller wave distortion. Thus, the distance between the two panes prior to the evacuation of the void differed for each individual pillar which caused the pillars to be subjected to different compression forces upon evacuation of the void. After the evacuation of the void, the VIG-unit was taken apart and the pillars were collected. Of the original 140 pillars, 137 were collected. Of these, 11 pillars had been toppled on the side prior to evacuation of the void so that the compression has not been applied in the longitudinal direction of the pillars. Furthermore, 2 pillars were not in a state so that they could be measured. The longitudinal extent eL of the remaining 124 pillars were measured by means of SEM and four examples are shown in FIG. 10a, where the measured expanded longitudinal extents of the pillars 1 after the compression force F has been lifted are 278 µm, 328 µm, 354 µm and 421 µm, respectively, which exemplifies the consequence of varying compression forces F being applied to the individual pillars due to roller waves of the thermally tempered panes. In FIG. 10b a histogram of the longitudinal extent eL (in the figure caption called Thickness) of the 124 pillars.

The pillars according to the present disclosure may be homogeneous with respect to material, i.e., being manufactured in one material only, preferably a metal or a metal alloy as described herein. Alternatively, the pillars may be manufactured as bi-layer structures with one material for the upper and lower parts and a second material for the deformable part of the pillar. In yet another embodiment, the pillars may comprise a tri-layer structure, where the contact area between the upper and lower parts and the deformable part is manufactured in a third material that is suitable to bridge the differences in mechanical and/or material properties between the materials used for each respective element.

In still other embodiments, the pillar can comprise two deformable parts joined together, wherein a first deformable part is more compressible and a second deformable part is less compressible. In still another embodiment, a pillar can include upper and lower parts that comprise different materials from each other, for example where one of the upper or lower parts is more compressible, and the other of the upper or lower parts is less compressible. For example, a part that is more compressible is in contact with the first glass pane 3a while the second part is in contact with the second glass pane 3b.

In some embodiments, the pillars are heat resistant to a temperature of at least 200° C., preferably to at least 300° C. to allow for heating of the VIG unit during manufacturing thereof, so that the physical properties of the pillars are preserved after heating and subsequent cooling to ambient temperature, e.g., to about 20° C. According to other embodiments, in certain manufacturing procedures, the VIG unit is heated to higher temperatures, and the pillars are heat resistant to a temperature of 380° C. or 500° C.

One or more parts of the pillar, for example the deformable part, may be preferably made from a metal or a metal alloy. The metal or metal alloy can include, but is not limited to, iron, tungsten, nickel, chromium, titanium, molybdenum, carbon steel, chromium steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride, zirconia, silicon carbide, or the like. In an embodiment, the open structure can be made from a metal alloy that is an austenitic nickel-chromium-based superalloy. Other suitable metal or metal alloys include low carbon austenitic chromium-nickel stainless steels including SS 301, SS 304, SS 308, and SS 316, and high-carbon martensitic steels including 440C. Tool steels may also be used for the manufacture of pillars, which include, but are not limited to, unalloyed tool steels with small amounts of tungsten, for example C45W, C70W and C85W, low alloy cold work tool steels like 100Cr6 and alloy cold work tool steels like X 210 Cr 12, X 155 CrVMo 12 1, and X 36 CrMo 17.

The compressive yield strength of the pillar may be greater than 400 MPa, greater than 600 MPa, greater than 800 MPa, greater than 1 GPa, or greater than 2 GPa at 20° C. In some embodiments, the compressive yield strength is between 400 MPa and 110 GPa, between 400 MPa and 50 GPa, between 400 MPa and 25 GPa, between 400 MPa and 12 GPa, between 1 GPa and 110 GPa, between 1 GPa and 50 GPa, between 1 GPa and 25 GPa, or between 1 GPa and 12 GPa at 20° C. In a particular embodiment, the deformable part is made of a metal or a metal alloy having a compressive yield strength greater than about 1 GPa at 20° C.

The pillar may have a thermal conductivity of less than about 40 W m$^{2°}$ K$^{-1}$, less than 20 W m$^{2°}$ K$^{-1}$, less than 10 W m$^{2°}$ K$^{-1}$, or less than 5 W m$^{2°}$ K$^{-1}$. The pillar may have a thermal conductivity of at least 0.1 W m$^{2°}$ K$^{-1}$.

Other metals that may be employed include pure nickel (Ni) which by means of defect hardening may so as to reach at yield strength higher than about 1 GPa. The low carbon austenitic chromium-nickel stainless steels are normally soft with a lower compressive yield strength, which may be increased by hardening of the material by cold working of the pillar prior to compression thereof. Thus, SS 301 may by cold working obtain yield strength in the range of about 1.6-1.9 GPa and SS 304 may obtain compressive yield strength of about 1.35 GPa. High-carbon martensitic steels like the 440C series which can be hardened by heat treatment to a sufficient degree so as to reach a compressive yield strength greater than about 1 GPa at 20° C. In tool steels hardness may be also influenced by heat treatment, such as quenching and subsequently tempering, but generally they are sufficiently hard due to the carbon content with compressive yield strength prior to compression of the pillars of greater than about 1 GPa.

The pillar can include a surface coating that is disposed on the outer surface of the pillar to reduce cracks in the glass panes and reduce scratches when the glass panes flex and move. Any suitable surface coating may be used, for example a surface coating that comprises a low coefficient of friction (e.g., has a lower coefficient of friction than the pillar material). The surface coating can include tungsten disulfide (WS2), molybdenum disulfide (MoS2), tungsten diselenide (WSe2), molybdenum diselenide (MoSe2), or a combination thereof.

In some embodiments, the surface coating is disposed on the contact surfaces of the pillars 1, i.e., the first and the top and bottom contact surfaces 7a, 8a may receive a coating in order to prevent shear forces between these contact surfaces 7a, 8a and the inner surfaces 4a, 4b of the two glass panes 3a, 3b of the VIG unit 900 from causing damages to the glass panes 3a, 3b. The shear forces may arise from temperature related deformations of the glass panes 3a, 3b or from wind loads or physical impacts on the exterior sides of the glass panes 3a, 3b. The coating serves to promote a physical displacement between the contact surfaces 7a, 8a of the pillars 1 and the inner surfaces 4a, 4b of the two glass panes 3a, 3b.

The pillars as described herein may be manufactured by a number of different manufacturing technologies, including but not limited to the following. One group of technologies includes employing additive manufacturing technology to a metal powder bed by means of selective employment of laser light to fuse particles of the metal powder. The fusion of particles may include the melting of particles in a method known as Selective Laser Melting, (SLM), and/or may include the sintering of particles in a method known as Selective Laser Sintering (SLS) or Micro Laser Sintering (MLS). In a preferred embodiment, the process for the fusion of particles of a metal powder is conducted repeatedly to form consecutive layers of the metal powder. For example, during manufacturing, a thin layer of metal powder can be applied to a build platform. The powder can be selectively fused by a laser process that is precise to each cross section. The building platform can be subsequently lowered, and the procedure of powder coating, fusing, and platform lowering can be repeated to form the material in a layer by layer manner, until the part is completed.

In additional embodiments, the pillar can be fabricated using a suitable molding process. The shape of the pillar is determined by the mold cavity, which can have the inverse shape corresponding to and dimensions of the desired pillar shape. Any suitable molding method may be used, including those available in the art.

In other embodiments, the pillars are prepared by cutting or carving material away from a solid metal substrate, for example by means of laser light or by means of Electric Discharge Machining (EDM) to obtain the requested shape of the pillar.

In some embodiments, the pillars can be formed by an electrodeposition process, for example an electroforming process. Electroforming is the metal forming process where metal is grown by electrodeposition onto a substrate. An electrolytic bath is used to deposit the metal onto a conductive patterned surface, e.g., formed by means of a non-conductive mask applied to a conductive surface. In an embodiment, a process for the manufacture of compressible pillars is provided. The process comprises the step of providing the pillar with an upper part and a lower part having a top and a bottom contact surface that are substantially coplanar with each other, respectively, for abutting with the glass panes of the VIG unit. The top and bottom contact surfaces extend substantially in parallel to each other and the glass panes, wherein the upper and lower parts each independently have a longitudinal extent in the range of 0.025 to 0.1 mm, preferably in the range of 0.04 to 0.075 mm. In a particular embodiment, such process may further include using an additive manufacturing process to prepare the upper and lower parts having the specified longitudinal extent. The upper and lower parts may be further processed to become planar, for example machined, polished, or the like. A reduction of the thickness or the longitudinal extent of the upper and lower parts may be useful in obtaining a final design of the pillar that in a compressed state may be sufficiently small to allow for the distance between the two glass panes of the VIG unit to become as small as 0.2 mm or 0.1 mm when a vacuum is applied to the VIG unit. In still another embodiment, a method of producing a vacuum insulated glazing (VIG) unit comprises the steps of providing first and second substantially parallel glass panes having a plurality of compressible pillars having a longitudinal extent and disposed between the first and second panes, forming a sealed cavity between the first and the second glass panes and a peripheral seal, and evacuating the sealed cavity, wherein the pillars are compressed between the first and the second glass panes and have a compressed longitudinal extent that is less than the longitudinal extent.

In some embodiments, the method may further include the step of applying an external force to at least one of the first or second glass panes to push the glass panes towards each other and thereby compress the plurality of pillars, wherein the pillar have a compressed longitudinal extent. The external force may be provided by a clamp or by evacuating the sealed cavity so that the surrounding gas pressure, such as the atmospheric pressure, will exert an external force on the glass panes. In a further step, the external force or vacuum is at least partially released and the plurality of pillars expand to have an expanded longitudinal extent.

The expansion of the pillars in the VIG unit when the compression force is fully released may be detected by means of obtaining a measure of the change in longitudinal extent of the plurality of pillars when the pressure in the cavity of the VIG unit is reduced from atmospheric pressure to a reduced pressure, where the pillars are substantially free of an outside compression force, such as a pressure corresponding to the pressure in the evacuated cavity. The measurement may be obtained as a distance between the outer surfaces of the first and second glass panes at the position of the given pillar or as the actual longitudinal extent of the pillar, which may be determined by means of optical measurement, such as by reflecting laser light in the surfaces of the two glass panes. A subsequent microscope examination of the structures of the pillars may be applied to determine irreversible deformation and possible strain hardening of the pillars, in particular for the open structure, i.e. the open regions between the deformable part of the pillar.

Another embodiments provides a VIG unit comprising a first and second substantially parallel glass panes and a plurality of compressible pillars disposed between the first and second glass panes, wherein the plurality of pillars are compressed between the first and the second glass panes. The VIG unit further includes a sealed cavity between the first and the second glass panes and a peripheral seal, wherein the sealed cavity is under reduced pressure.

Articles may be prepared to include the vacuum insulated glass unit described herein. In an embodiment, a window includes the vacuum insulated glass unit. The window may further include a frame. The window may be used for residential or commercial purposes.

Also provided is use of the articles herein. For example, an embodiment provides use of the vacuum insulated glazing unit for a window. Another embodiment provides use of the window for a fixed or ventilating window of a commercial building and/or residential building. Another embodiment provides use of the window for a roof window or a skylight window, for example a fixed or ventilating window for a roof or a skylight. Still another embodiment provides use of the window for a vertical window application, such as for use on the side of a commercial and/or residential building. The vacuum insulated glazing unit described herein can also be used for other applications that use a window or transparent screens, for example viewports, console screens, time pieces, vehicles, and others.

The invention claimed is:

1. A compressible pillar for the preparation of a vacuum insulated glazing (VIG) unit, having a longitudinal extent in a longitudinal direction when in an uncompressed state, and comprising:
    a deformable part comprising an open structure, wherein the open structure at least partially collapses under a compression force acting in the longitudinal direction of on the compressible pillar, the compression force being of at least one value selected within the range of 60 N to 320 N, wherein the longitudinal extent of the compressible pillar decreases to a compressed longitudinal extent when the compressible pillar is subjected to the compression force, and wherein the compressed longitudinal extent of the compressible pillar increases to an expanded longitudinal extent when the compression force is released, wherein the increase in the longitudinal extent is less than the decrease in the longitudinal extent.

2. The compressible pillar according to claim 1, wherein the value of the compression force may be selected anywhere in the range of 60 N to 140 N.

3. The compressible pillar according to claim 1, wherein the compression force is at least one value selected within the range of 140 N to 230 N.

4. The compressible pillar according to claim 1, wherein a relative increase in the longitudinal direction of the compressible pillar is in the range of 0.5% to 50% of the relative decrease, and wherein the relative increase is calculated by dividing the increase in the longitudinal extent by the longitudinal extent in the uncompressed state, and the relative decrease is calculated by dividing the decrease in the longitudinal extent by the longitudinal extent in the uncompressed state.

5. The compressible pillar according to claim 1, wherein the relative decrease in the longitudinal extent of the compressible pillar under the compression force is equal to a compression factor multiplied by the compression force, wherein the compression factor is in the range of $0.8 \cdot 10^{-3} N^{-1}$ to $5.0 \cdot 10^{-3} N^{-1}$.

6. The compressible pillar according to claim 1, wherein the longitudinal extent in the uncompressed state is in the range of 0.2 mm to 1.2 mm.

7. The compressible pillar according to claim 6, wherein the longitudinal extent in the uncompressed state is in the range of 0.3 mm to 0.8 mm.

8. The compressible pillar according to claim 1, wherein the deformable part comprises a metal or a metal alloy.

9. The compressible pillar according to claim 8, wherein said metal or said metal alloy has compressive yield strength greater than 1 GPa at 20° C.

10. The compressible pillar according to claim 8, wherein said metal alloy is an austenitic nickel-chromium-based superalloy.

11. The compressible pillar according to claim 1, further comprising an upper part and a lower part having a top contact surface and a lower contact surface, respectively, for abutting with first and second glass panes of the VIG unit, wherein the top contact surface and the lower contact surface are substantially planar to each other.

12. The compressible pillar according to claim 11, wherein the top contact surface and the lower contact surface each has an area that is the same or different, and is in the range of $0.1 \text{ mm}^2$ to $0.3 \text{ mm}^2$.

13. The compressible pillar according to claim 11, wherein the compressible pillar further comprises a substantially uniform cross-section in a parallel plane, wherein the parallel plane is perpendicular to the top contact surface and the lower contact surface.

14. The compressible pillar according to claim 13, wherein the deformable part of the pillar comprises two structures separately connecting a first end structure and a second end structure.

15. The compressible pillar according to claim 14, wherein each of said structures comprises a first element extending from the first end structure towards the second end structure at a first slanted angle to the longitudinal direction of the pillar and a second element extending from the second end structure towards the first end structure at a second slanted angle to the longitudinal direction of the pillar, the first and the second slanted angles being of substantially the same magnitude so that the first element and the second element are slanted in opposite directions.

16. The compressible pillar according to claim 15, wherein the first element and the second element of each of said structures of the deformable part of the pillar are joined in a joining part of the deformable part, wherein the joining part is formed with a partly annular cross-section with a curved transition to the first and second elements.

17. The compressible pillar according to claim 13, wherein the first end structure, the second end structure and the deformable part form a cross-section in said parallel planes of essentially the shape of a capital sigma.

18. The compressible pillar according to claim 17, wherein the first end structure, the second end structure and the deformable part form a cross-section in said parallel planes of essentially the shape of a capital sigma joined with a mirrored capital sigma.

19. The compressible pillar according to claim 13, wherein the deformable part comprises a first element extending from the upper part towards the lower part at a first angle to the longitudinal direction of the compressible pillar and a second element extending from the lower part towards the upper part at a second angle to the longitudinal direction of the compressible pillar, wherein the first and the second angles have substantially the same absolute magnitude so that the first element and the second element are angled in opposite directions.

20. The compressible pillar according to claim 19, wherein the first element and the second element of the deformable part are connected in a joining part, wherein the joining part has a partially annular cross-section with a curved transition to each of the first and second elements.

21. The compressible pillar according to claim 1, wherein the open structure is configured so that the upper part and the lower part are displaced towards each other substantially in the longitudinal direction when the compressible pillar is subjected to the compression force.

22. The compressible pillar according to claim 1, wherein the pillar in the compressed state is susceptible to shear strain when exposed to a shear force between substantially parallel and substantially plane end surfaces of the pillar suitable for being in abutment with the surfaces of the glass panes of the VIG unit, the shear strain being a shear factor time the ratio of the shear force to the average area of the first and second substantially plane end surfaces, wherein the shear factor is less than 55 GPA for shear forces less than 100 N.

* * * * *